United States Patent
Vilaipornsawai et al.

(10) Patent No.: US 11,464,038 B2
(45) Date of Patent: Oct. 4, 2022

(54) SINGLE/MULTIPLE DCIS FOR NETWORK COORDINATION SCHEMES

(71) Applicant: Huawei Technologies Co., Ltd., Shenzhen (CN)

(72) Inventors: Usa Vilaipornsawai, Nepean (CA); Mohammadhadi Baligh, Ottawa (CA); Aman Jassal, Ottawa (CA); Hamidreza Farmanbar, Ottawa (CA); Zhengwei Gong, Ottawa (CA); Amine Maaref, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/459,001

(22) Filed: Jul. 1, 2019

(65) Prior Publication Data

US 2020/0008231 A1    Jan. 2, 2020

Related U.S. Application Data

(63) Continuation of application No. PCT/CN2018/074788, filed on Jan. 31, 2018.

(60) Provisional application No. 62/502,096, filed on May 5, 2017, provisional application No. 62/475,781, filed on Mar. 23, 2017, provisional application No. 62/454,603, filed on Feb. 3, 2017.

(51) Int. Cl.
*H04W 72/12* (2009.01)
*H04B 7/024* (2017.01)
*H04L 5/00* (2006.01)

(52) U.S. Cl.
CPC ........ *H04W 72/1289* (2013.01); *H04B 7/024* (2013.01); *H04L 5/0035* (2013.01); *H04W 72/1273* (2013.01); *H04W 72/1284* (2013.01)

(58) Field of Classification Search
CPC ......... H04W 72/1289; H04W 72/1273; H04W 72/1284; H04W 72/042; H04B 7/024; H04B 7/088; H04L 5/0035; H04L 5/009
See application file for complete search history.

(56) References Cited

U.S. PATENT DOCUMENTS

| 2010/0173660 A1 | 7/2010 | Liu et al. |
| 2010/0238821 A1 | 9/2010 | Liu et al. |
| 2013/0083681 A1* | 4/2013 | Ebrahimi Tazeh Mahalleh .......... H04L 5/0057 370/252 |
| 2013/0094442 A1 | 4/2013 | Kim et al. |
| 2013/0229931 A1* | 9/2013 | Kim ...................... H04W 76/11 370/252 |
| 2014/0098779 A1* | 4/2014 | Kim ...................... H04L 5/0035 370/329 |
| 2014/0192734 A1 | 7/2014 | Ng et al. |

(Continued)

FOREIGN PATENT DOCUMENTS

| CN | 103891182 A | 6/2014 |
| CN | 103959730 A | 7/2014 |
| CN | 104919724 A | 9/2015 |

*Primary Examiner* — Ian N Moore
*Assistant Examiner* — Sun Jong Kim
(74) *Attorney, Agent, or Firm* — Slater Matsil, LLP

(57) ABSTRACT

Methods and apparatus are provided that provide single or multiple Physical Downlink Control Channel (PDCCH) messages for single or multiple Physical Downlink Shared Channel (PDSCH) messages to support network coordination schemes such as Non-Coherent Joint Transmission.

4 Claims, 16 Drawing Sheets

(56) References Cited

U.S. PATENT DOCUMENTS

| | | | |
|---|---|---|---|
| 2014/0204853 A1* | 7/2014 | Ko | H04L 5/0035 370/329 |
| 2014/0233541 A1 | 8/2014 | Kim et al. | |
| 2015/0023278 A1* | 1/2015 | Boccardi | H04L 5/0048 370/329 |
| 2015/0163041 A1* | 6/2015 | Kodali | H04W 72/042 370/252 |
| 2016/0353421 A1* | 12/2016 | Liao | H04L 5/0053 |
| 2017/0373741 A1* | 12/2017 | Yang | H04L 1/18 |
| 2018/0046824 A1* | 2/2018 | Rajadurai | H04L 61/2038 |
| 2018/0132227 A1* | 5/2018 | Ghosh | H04B 7/024 |
| 2018/0220478 A1* | 8/2018 | Zhu | H04L 45/306 |

* cited by examiner

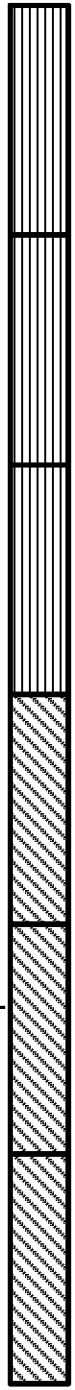
FIG. 5

SINGLE/MULTIPLE DCIS FOR NETWORK COORDINATION SCHEMES

CROSS-REFERENCE TO RELATED APPLICATIONS

This application is a continuation of PCT application No. PCT/CN2018/074788 entitled "Downlink Control Information for Network Coordination Schemes" filed Jan. 31, 2018, which claims the benefit of U.S. Provisional Patent Application No. 62/454,603 entitled "Downlink Control Information for Network Coordination Schemes" filed Feb. 3, 2017, U.S. Provisional Patent Application No. 62/475,781 entitled "Downlink Control Information for Network Coordination Schemes" filed Mar. 23, 2017, and U.S. Provisional Patent Application No. 62/502,096 entitled "Downlink Control Information for Network Coordination Schemes" filed May 5, 2017, all of which applications are hereby incorporated herein by reference in their entireties.

TECHNICAL FIELD

The present disclosure relates generally to wireless communications and, in particular, to downlink control information design and associated methods and apparatus.

BACKGROUND

To support high capacity demand and new applications in evolving networks such as fifth generation (5G) or New Radio (NR) wireless networks, ultra-dense networks (UDN) and moving networks (MN) are being developed. Such network architectures are challenged by high capacity demand, inter-cell interference, frequent handovers, and fast moving users, among other challenges. Technologies, such as Coordinated MultiPoint (CoMP) or Joint Transmission (JT) CoMP have been proposed to alleviate such challenges. In such schemes, a User Equipment (UE) may be served on the Uplink (UL) and/or Downlink (DL) by multiple transmission-reception points (TRPs) of a radio access network (RAN).

SUMMARY

In many wireless communication networks, downlink transmission of a data stream from a TRP to a UE is done over a Physical Downlink Shared Channel (PDSCH) and the UE is instructed where and how to find and decode its downlink data via Downlink Control Information (DCI) carried on a PDCCH (Physical Downlink Control Channel). However, the problem exists as to how to support downlink transmission of the same downlink data stream(s) to a UE from multiple TRPs at least with ideal backhaul connections, and different data streams from multiple TRPs with both ideal and non-ideal backhaul connections.

Aspects of this disclosure provide mechanisms to support one or more PDCCH(s) for network coordination schemes such as those being contemplated for NR to support the delivery of the same or different PDSCH data stream(s) to a UE from multiple TRPs.

According to a first aspect of the present disclosure, there is provided a method for a UE in a wireless network. The method includes receiving, at the UE, at least one PDCCH message that includes DCI in respect of at least one PDSCH message; and in response to receiving the at least one PDCCH message, receiving at least one PDSCH message in accordance with the DCI included in the at least one PDCCH message. Receiving the at least one PDCCH message may include either receiving one PDCCH message that includes DCI in respect of at least one PDSCH message from multiple TRPs, or receiving multiple PDCCH messages, each PDCCH message including DCI in respect of at least one PDSCH message.

In some embodiments of the first aspect, the PDSCH messages from different TRPs carry the same transport block (TB) of downlink data, or wherein the PDSCH messages from different TRPs carry different TBs of downlink data.

In some embodiments of the first aspect, the method further includes receiving, at the UE, higher-layer signaling from the wireless network indicating a number S of search spaces for the UE to search, where $S \geq 1$, wherein receiving the at least one PDCCH message comprises receiving K PDCCH messages, where $K \geq 2$, over the S search spaces, and wherein either $K \leq S$ and the UE stops searching after K messages have been received, or $K > S$.

In some embodiments of the first aspect, at least two of the K PDCCH messages are located in the same search space, located in multiple overlapping search spaces, or located in different search spaces.

In some embodiments of the first aspect, the at least two PDCCH messages are distinguished by different demodulation reference signals (DMRSs).

In some embodiments of the first aspect, the method further includes transmitting, at least one physical uplink control channel (PUCCH) message that includes Uplink Control Information (UCI) related to at least a subset of the received PDCCH messages.

In some embodiments of the first aspect, there is a one-to-one mapping between UCI and PDCCH or there is a many-to-one mapping between PDCCH and UCI.

According to a second aspect of the present disclosure, there is provided a method for a TRP in a wireless network. The method includes transmitting, to the UE, at least one PDCCH message that includes DCI in respect of at least one PDSCH message; and transmitting, to the UE, at least one of the at least one PDSCH message in accordance with the DCI in the at least one PDCCH message. Transmitting the at least one PDCCH message may include either transmitting one PDCCH message that includes DCI in respect of at least one PDSCH message from multiple TRPs, or transmitting multiple PDCCH messages, each PDCCH message including DCI in respect of at least one PDSCH message.

In some embodiments of the second aspect, the method further includes transmitting, to the UE, higher-layer signaling indicating a number S of search spaces for the UE to search, where $S \geq 1$, wherein transmitting the at least one PDCCH message comprises transmitting K PDCCH messages, where $K \geq 2$, over the S search spaces, and wherein either $K \leq S$ and the UE stops searching after K messages have been received, or $K > S$.

In some embodiments of the second aspect, the method further includes receiving, from the UE, at least one PUCCH message that includes UCI related to at least a subset of the transmitted PDCCH messages.

According to a third aspect of the present disclosure, there is provided a UE that includes a memory storage storing instructions and one or more processors in communication with the memory, wherein the one or more processors execute the instructions to: receive at least one PDCCH message that includes DCI in respect of at least one PDSCH message; in response to receiving the at least one PDCCH message, receive at least one PDSCH message in accordance with the DCI included in the at least one PDCCH message;

and wherein the one or more processors execute the instructions to receive the at least one PDCCH message through receiving one PDCCH message that includes DCI in respect of at least one PDSCH message from multiple TRPs, or receiving multiple PDCCH messages, each PDCCH message including DCI in respect of at least one PDSCH message.

In some embodiments of the third aspect, the PDSCH messages from different TRPs carry the same transport block (TB) of downlink data, or wherein the PDSCH messages from different TRPs carry different TBs of downlink data.

In some embodiments of the third aspect, the one or more processors further execute the instructions to receive, at the UE, higher-layer signaling from the wireless network indicating a number S of search spaces for the UE to search, where S≥1, wherein receiving the at least one PDCCH message comprises receiving K PDCCH messages, where K≥2, over the S search spaces, and wherein either K≤S and the UE stops searching after K messages have been received, or K>S.

In some embodiments of the third aspect, at least two of the K PDCCH messages are located in the same search space, located in multiple overlapping search spaces, or located in different search spaces.

In some embodiments of the third aspect, the at least two PDCCH messages are distinguished by different demodulation reference signals (DMRSs).

In some embodiments of the third aspect, the one or more processors further execute the instructions to transmit at least one physical uplink control channel PUCCH message that includes UCI related to at least a subset of the received PDCCH messages.

In some embodiments of the third aspect, there is a one-to-one mapping between UCI and PDCCH or there is a many-to-one mapping between PDCCH and UCI.

According to a fourth aspect of the present disclosure, there is provided a TRP that includes a memory storage storing instructions and one or more processors in communication with the memory, wherein the one or more processors execute the instructions to: transmit, to the UE, at least one PDCCH message that includes DCI in respect of at least one PDSCH message; and transmit, to the UE, at least one of the at least one PDSCH message in accordance with the DCI in the at least one PDCCH message, wherein the one or more processors execute the instructions to transmit the at least one PDCCH message through transmitting one PDCCH message that includes DCI in respect of at least one PDSCH message from multiple TRPs in a cooperating set of TRPs serving the UE, or transmitting multiple PDCCH messages, each PDCCH message including DCI in respect of at least one PDSCH message.

In some embodiments of the fourth aspect, the one or more processors further execute the instructions to transmit, to the UE, higher-layer signaling indicating a number S of search spaces for the UE to search, where S≥1, wherein transmitting the at least one PDCCH message comprises transmitting K PDCCH messages, where K≥2, over the S search spaces, and wherein either K≤S and the UE stops searching after K messages have been received, or K>S.

In some embodiments of the fourth aspect, the one or more processors further execute the instructions to receive, from the UE, at least one PUCCH message that includes UCI related to at least a subset of the transmitted PDCCH messages.

Other aspects and features of embodiments of the present disclosure will become apparent to those ordinarily skilled in the art upon review of the following description.

BRIEF DESCRIPTION OF THE DRAWINGS

Embodiments of the invention will be described in greater detail with reference to the accompanying drawings.

FIG. 5 is a diagram showing multiple PDCCH messages corresponding to multiple PDCCH in the same control resource set or same search space and multiple PDCCH messages corresponding to multiple PDCCH in different control resource sets or different search spaces.

DETAILED DESCRIPTION OF ILLUSTRATIVE EMBODIMENTS

Figure 1:
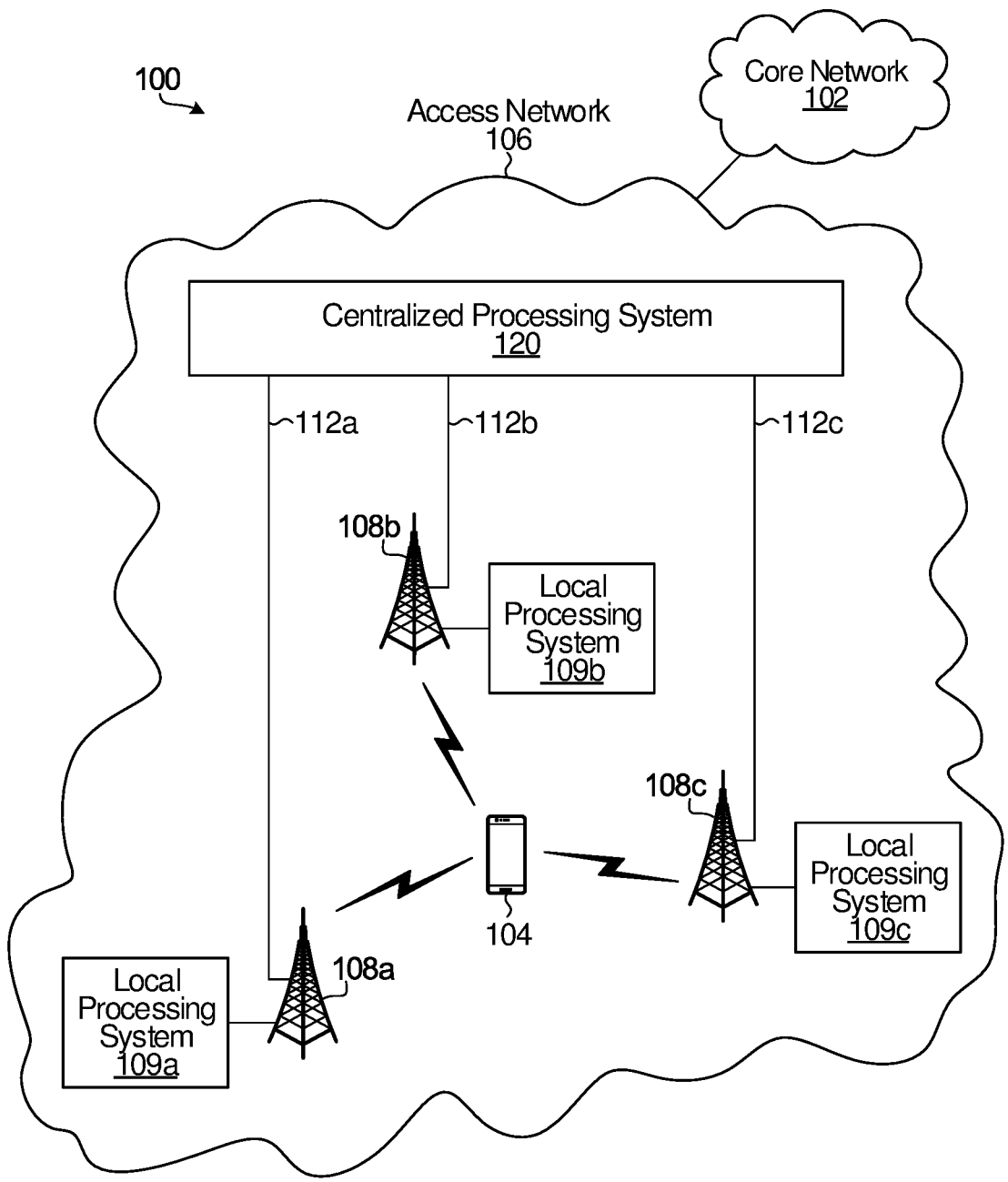
FIG. 1 is a block diagram of a communications network according to an embodiment of the present disclosure.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

NR wireless network may support one or more CoMP strategies such as Dynamic Point Selection (DPS), Coherent Joint Transmission (CJT), Non-Coherent Joint Transmission (N-CJT) and Coordinated Scheduling/Beamforming (CS/CB).

Specifically, NR wireless network may support downlink transmission of the same downlink data stream(s) to a UE from multiple TRPs at least with ideal backhaul connections, and different data streams from multiple TRPs with both ideal and non-ideal backhaul connections.

In many wireless communication networks, the physical channels used for communication are classified as either data channels or control channels. For example, the physical channels in 3$^{rd}$ Generation Partnership Project (3GPP) Long Term Evolution (LTE) communication networks may be classified into data channels such as Physical Downlink Shared Channel (PDSCH) and Physical Uplink Shared Channel (PUSCH) and control channels such as PDCCH (Physical Downlink Control Channel) and Physical Uplink Control Channel (PUCCH) amongst others.

The PDCCH carries control information that is referred to as Downlink Control Information (DCI). The DCI may include control information such as resource allocation of PDSCH (which may be referred to as Downlink (DL) grant, because it identifies the time-frequency resource element(s) allocated/granted for downlink data transmissions) and resource allocation of PUSCH (which may be referred to as Uplink (UL) grant, because it identifies the time-frequency resource element(s) allocated/granted for uplink data transmissions). In other words, the DCI carried by PDCCH instructs a User Equipment (UE) where and how to find and decode its downlink data in PDSCH.

Embodiments of the present disclosure provide mechanisms to support one or more PDCCH(s) for network coordination schemes such as those being contemplated for NR to support the delivery of the same or different PDSCH data stream(s) to a UE from multiple TRPs.

Turning now to the figures, some specific example embodiments will be described.

FIG. 1 is a diagram illustrating a communication system in accordance with one embodiment. The communication system 100 includes a core network 102 and an access network 106.

The core network 102 may provide any of various services, such as call control/switching and gateways to other networks. The core network 102 includes network components such as routers, switches, and servers.

The access network 106 is a wireless communication network, and is connected or coupled to the core network 102. The network elements or nodes 108a, 108b, 108c provide wireless communication service within respective wireless coverage areas. Each network element 108a-c may be implemented using a radio transceiver, one or more antennas, and associated processing circuitry, such as antenna radio frequency (RF) circuitry, analog-to-digital/digital-to-analog converters, etc. Base stations, transmission-reception points (TRPs), and evolved NodeBs (eNBs) are examples of the network elements 108a-c.

UEs 104 wirelessly accesses the communication system 100 using the access network 106. UE 104 includes a radio transmitter and a radio receiver which may be integrated into a radio transceiver, one or more antennas, and associated processing circuitry, such as antenna radio frequency (RF) circuitry, analog-to-digital/digital-to-analog converters, etc. The network elements 108a-c and the UE 104 may include similar types of components to support communications with each other in the communication system 100, but the actual implementations may be different. For example, the UE 104 is portable between locations, whereas the network elements 108a-c are typically intended to be installed at a fixed location. While it is understood that communications systems may employ multiple network elements capable of communicating with a number of UEs, only three network elements and a single UE are illustrated in FIG. 1 for simplicity.

The network elements 108a-c are connected to a centralized processing system 120 in the access network 106, via respective communication links 112a, 112b, 112c. Each communication link 112a-c is an optical fiber communication link in one embodiment. Each network element 108a-c includes circuitry for transmitting data to the centralized processing system 120 and for receiving data from the centralized processing system 120 via its respective communication link 112a-c. Although shown as a single centralized processing system 120 in FIG. 1, the centralized processing system 120 may be implemented by a network of one or more processing and control servers. Alternatively, the centralized processing system 120 may be implemented as a single server.

The network elements 108a-c each include their own local processing system 109a, 109b, 109c for handling local processing requirements at the network element. The network elements 108a-c may serve as a gateway between wireline and wireless portions of the access network 106, although this need not be the case in embodiments in which the communication links 112a-c are wireless links. The network elements 108a-c may be placed at fixed locations by a network provider, for example, to provide a substantially continuous wireless coverage area. For example, the wireless coverage areas of network elements 108a-c may overlap each other so that UE 104 may be served by any one or more of the network elements 108a-c. In other words, the network elements 108a-c can function as a cooperating set of TRPs for UE 104.

3GPP LTE-Advanced (LTE-A) communication networks are cellular-based and provide an option for dual connectivity (DC) that enables a UE to receive multiple data streams from two different cells, which are referred to as a master eNB (MeNB) and a secondary eNB (SeNB). In LTE-A DC, the UE has different identities, e.g., cellular radio network temporary identifiers (C-RNTIs), across the MeNB and the SeNB and the choice of MeNB and SeNB is the same for all UEs being served by the two eNBs, i.e., the choice of MeNB and SeNB is not UE-specific. In contrast, in some embodiments of the present disclosure, a UE may receive multiple data streams from two or more TRPs that belong to the same cell and the UE may have the same identity, e.g., C-RNTI, across the two or more TRPs that belong to the same cell. For example, in one embodiment of the present disclosure, the access network 106 may be cellular-based, the network elements 108a and 108b may both belong to the same cell, and UE 104 may have the same identity, e.g., C-RNTI across network elements 108a and 108b. In further contrast to LTE-A DC, in some embodiments of the present disclosure, the choice of the network element that serves as the master or anchor for the group of network elements serving a UE may be UE-specific. For example, network element 108a may serve as the anchor network element for the group of network elements 108a-c when the group is serving UE 104, and a different one of the network elements, e.g., 108b or 108c, may serve as the anchor network element when the group is serving another UE (not shown in FIG. 1).

In some embodiments of the present disclosure, the network elements 108a-c may be configured to serve UE 104 in accordance with one or more CoMP transmission schemes, such as Dynamic Point Selection (DPS) or Non-Coherent Joint Transmission. In these network coordination schemes, the same or different downlink PDSCH data stream(s) can be transmitted to a UE from multiple TRPs. Aspects of the present disclosure that provide various mechanisms to support such network coordination schemes are described below. In particular, the mechanisms described below relate to the transmission of single or multiple PDCCH(s), sources for single/multiple PDCCH(s) and PDCCH search spaces, beam management, Uplink Control Information (UCI) transmission, periodic/aperiodic CSI requests, UL/DL Time Domain Duplexed (TDD) transmission, DCI content, ACK/NACK channels, signaling, standard specifications, transmission schemes for control channels, data flow assignment amongst TRPs, and demodulation reference signals (DMRS) for control channels.

Following the description of these mechanisms, example embodiments that combine various aspects of these mechanisms are described for illustrative purposes. It will be appreciated that other advantageous permutations and combinations of the following mechanisms are contemplated within the scope of the present disclosure.

Transmission of Single or Multiple PDCCH(s)

Dynamic Point Selection (DPS) is a DL CoMP technique that switches the serving data TRP of a UE dynamically among the UE's cooperating set of TRPs. DPS can provide performance improvement due to TRP selection-diversity gains and dynamic UE load balancing benefits.

For DPS, only a single PDCCH message is required as only one TRP sends a PDCCH and PDSCH. The scheduling of DL data transmission can be either centrally at a centralized controller or can be done in a distributed manner at cooperating TRPs locally or can be done in any other suitable manner. The PDCCH and PDSCH transmissions are done in a Time Division Multiplexed (TDM) manner amongst the TRPs, i.e. different TRPs transmit at different times, which can be arranged, for example, in a dynamic manner (as in DPS) or in a pre-arranged manner (as in round-robin or randomized manners), and the UE does not necessarily need to be aware of the timing. In some embodiments, from the network perspective, the network can assign PDCCH to a TRP to send to a UE in a dynamic manner or a pre-arranged manner and the network coordinates the data transmission from one TRP at a time. From the UE perspective, the UE monitors for a maximum of one PDCCH DL message and one PDSCH at a time for DPS, because only one TRP sends a PDCCH and PDSCH in DPS.

In NC-JT, transmission of data layer(s) is performed from two or more TRPs without adaptive precoding across the TRPs. NC-JT schemes may involve transmitting the same or different data/codewords from different TRPs and the resource allocation on different TRPs may be the same or different. For example, in one scenario, different data/codewords are transmitted to a UE from different TRPs, with each TRP performing adaptive precoding independently. In another scenario, the same data/codeword is transmitted from different TPs with spatial diversity (e.g. space frequency block coding (SFBC))/spatial multiplexing. In either scenario, the allocations of time-frequency resources from different TRPs for a UE may be fully overlapped, partially overlapped, or not overlapped at all.

For the NC-JT scenario in which the same transport block (TB) is transmitted from different TRPs with spatial diversity, such as distributed SFBC, still only one PDCCH message is required, which may be sent through one or multiple TRPS (e.g. by SFBC).

For the NC-JT scenario in which multiple PDSCHs, e.g. multiple TBs are transmitted from multiple TRPs, either single or multiple PDDCH messages are required to convey the DCI for the multiple PDSCHs from the multiple TRPs. Here again, the scheduling can be done either in a centralized manner at a centralized controller or in a distributed manner at each TRP independently. From the network's perspective, one PDCCH message is sent by a TRP or multiple PDCCH messages are sent from a single or multiple TRPs in this scenario, and the network coordinates the PDCCH message transmission from multiple TRPs or each TRP independently sends the PDCCH message to the UE. From the UE perspective, a UE monitors for multiple PDCCH messages from a network (there may be none, one or multiple messages depending on the scheduling decision), and the UE receives multiple TBs from the network.

Sources for Single/Multiple PDCCH(s) and PDCCH Search Spaces

To support DL cooperation from multiple TRPs/beams/panels, single or multiple PDCCH message(s) can be transmitted from a single TRP. For example, for transmission of a single PDCCH message for a single PDSCH from each of multiple TRPs in a TDM manner, i.e. only one PDCCH/PDSCH can be transmitted to a UE from one TRP at a particular time, the PDCCH message can be transmitted to the UE from either an anchor TRP or a non-anchor TRP. The transmissions from multiple TRPs can be in round-robin or based on channel condition between the TRP to the UE (as in DPS), for example. However, if a single PDCCH message is transmitted from a single TRP for multiple PDSCHs from multiple TRPs, and the single PDCCH message only conveys one resource assignment, then multiple TBs will have overlapped time-frequency resources, because each PDSCH has the same resource assignment conveyed in the DCI of the single PDCCH message.

In other embodiments, a single PDCCH corresponding to a single PDSCH is transmitted from multiple TRPs. The single PDSCH may include one or multiple code words (CWs) and each CW may include one or multiple data layers. The same or different data layers may be transmitted from multiple TRPs. In some embodiments, if a single DCI corresponding to the PDCCH only conveys one resource assignment, then the resources used to transmit the same or different data layers from multiple TRPs may be fully or non-overlapping. In case of fully-overlapping resource, data layers from different TRPs use the same resources. In case of non-overlapping resources, some coordination between TRPs may be done to divide available/allowed resources into multiple non-overlapping resources. For example, data layers from a first TRP may be assigned resources in a first half of total allowed RBs, and data layers from a second TRP may be assigned the resources in a second half of the total allowed RBs that does not overlap with the first half. The division of resources can be based on frequency selectivity conditions of different UE-TRP links, for example.

Alternatively, if multiple PDCCH messages are sent from a TRP, for multiple PDSCHs from multiple TRPs, then the same or different DCI formats for the different PDCCH messages can be used. Moreover, the same or different search spaces for different PDCCH messages can be used and the same or different demodulation reference signals (DMRSs) can be used for different PDCCH message. The same antenna beam can be used to transmit the multiple PDCCHs from the TRP. Moreover, in same or different search spaces for different PDCCH messages, the PDCCH messages can be in the same or different OFDMA symbols within the same or different TTI(s). This applies to all cases with multiple PDCCH messages, whether they are sent from single or multiple TRPs.

In some embodiments, from the network perspective, for transmission of a single or multiple PDCCH message from a single TRP, the network sends one or multiple PDCCH(s) to a UE, and the network allocates one or multiple search spaces/DMRSs and an antenna beam to transmit the PDCCH message(s). From the UE perspective, a UE receives one or multiple PDCCH(s) and follows the instructions to decode one or multiple PDSCHs. A UE with a directional beam receive antenna and a single radio frequency (RF) receive chain, can receive PDCCH(s) from one beam/TRP at a time.

To support the DL transmission of the same PDSCH from a single or multiple TRP(s)/beam(s)/panel(s) or multiple PDSCHs from multiple TRPs/beams/panels, single or multiple PDCCH(s) can be transmitted from Multiple TRPs. For example, for transmission of Multiple PDCCH messages from multiple TRPs, for multiple PDSCHs from multiple TRPs, there can be a one-to-one correspondence between PDCCH and PDSCH, or one-to-many between one PDCCH and multiple PDSCHs. The PDCCH(s) can be transmitted from different antenna beams if the UE has multiple RF receive chains, and can be located in the same or different search spaces and may include the same or different DMRSs.

In some embodiments, from the network perspective, the network sends multiple PDCCH messages to a UE, and the network allocates multiple search spaces/DMRSs/beams to transmit PDCCH message(s). From the UE perspective, a UE receives multiple PDCCH messages and follows the instructions in the DCI of the PDCCH messages to decode multiple PDSCHs. A UE with multiple directional antenna beams, can potentially receive multiple PDCCH messages from multiple TRPs/beams/panels using multiple RF receive chains.

Search Spaces

UEs monitor for control channel information, e.g. DCI, in one or multiple search space(s) in one or multiple control resource sets. In a carrier bandwidth, there can be one or multiple control resource sets and in a control resource set there can be one or more search spaces. A control resource set is defined as a set of resource elements. In one embodiment, a control resource set is defined as a set of resource elements under a given numerology within which the UE attempts to decode control channel information. A search space includes at least the following: one or more aggregation levels (ALs), a number of decoding candidates for each aggregation level and the set of control channel elements (CCEs) for each decoding candidate.

Figure 2:
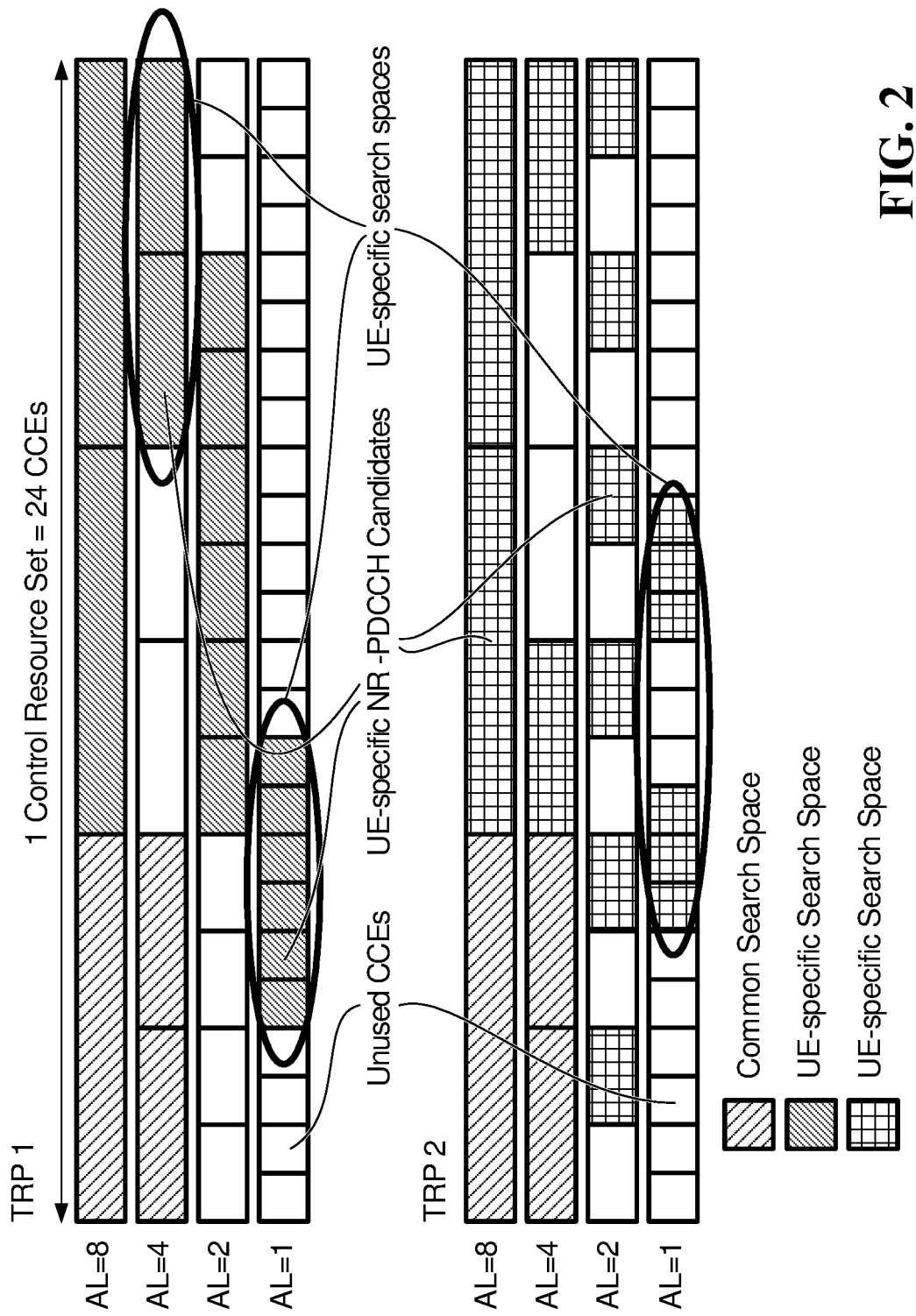
FIG. 2 is a diagram showing common and UE-specific search spaces for two TRPs.

For example, in NR, an NR-CCE consists of a fixed number of resource element groups (REGs). A REG is one RB during one OFDM symbol which may or may not include DMRS. This is at least for the case where the DL control region consists of one or a few OFDM symbol(s) of a slot or a mini-slot. A control resource set is defined as a set of REGs under a given numerology. The BW for control resource set is smaller than or equal to the carrier bandwidth (up to a certain limit). There can be multiple control resource sets in carrier BW, and there can be multiple search spaces in a control resource set. Time/frequency resources containing additional search spaces, can be configured using dedicated RRC signaling. NR-PDCCH can be mapped contiguously or non-contiguously in frequency. Multiple control resource sets can be overlapped in frequency and time for a UE. A search space in NR is associated with a single control resource set. The search spaces in different control resources sets are defined independently. Each candidate of NR DL control channel search space is composed by K NR-CCE(s). Control search space includes at least, aggregation level(s), number of decoding candidates for each aggregation level, and the set of CCEs for each decoding candidate. The max number of blind decoding candidates for a UE is defined independently of the number of control resource sets and the number of search spaces. It will be appreciated that the foregoing details are specific to NR. The present disclosure is not limited to NR implementations, and therefore it will be appreciated that embodiments of the present disclosure are not limited to the foregoing details, which have been provided for illustrative purposes only and are not to be taken as limiting. FIG. 2 is a diagram showing common and UE-specific search spaces for two TRPs (TRP1 and TRP2). Unused CCEs are not part of the search space (TRP1 and TRP2 each have 4 search spaces). A PDCCH candidate is a set of CCEs. A CCE is a set of resource elements within one or multiple OFDM symbols. It should be noted that PDCCH candidates don't have to be contiguous in the time or frequency domains.

The control resource set shown in FIG. 2 (and similarly shown in FIGS. 3, 4 and 5) is shown as including 24 control channel elements (CCEs) in each of the 4 OFDM symbols for illustration purposes only. Furthermore it is noted that for illustrative purposes FIGS. 2-5 reuse the aggregation levels in LTE where only 4 ALs are defined {1; 2; 4; 8} and the number of candidates in each AL is respectively {6; 6; 2; 2}. Numbers for NR have not yet been defined. Embodiments of the present disclosure are not limited to the same aggregation levels as LTE.

In general, the maximum number of active PDCCH messages (e.g., K) can be fewer, equal or more than the number of PDCCH search spaces (e.g. S). This means that there is a possibility that a given search space may include multiple PDCCH messages. In general, a UE may stop searching for other PDCCH messages after K PDCCH messages have been received.

The maximum number of active PDCCH messages (e.g., K) and the number of search spaces (e.g., S) may be implied through standard specifications and/or through configuration.

Figure 3:
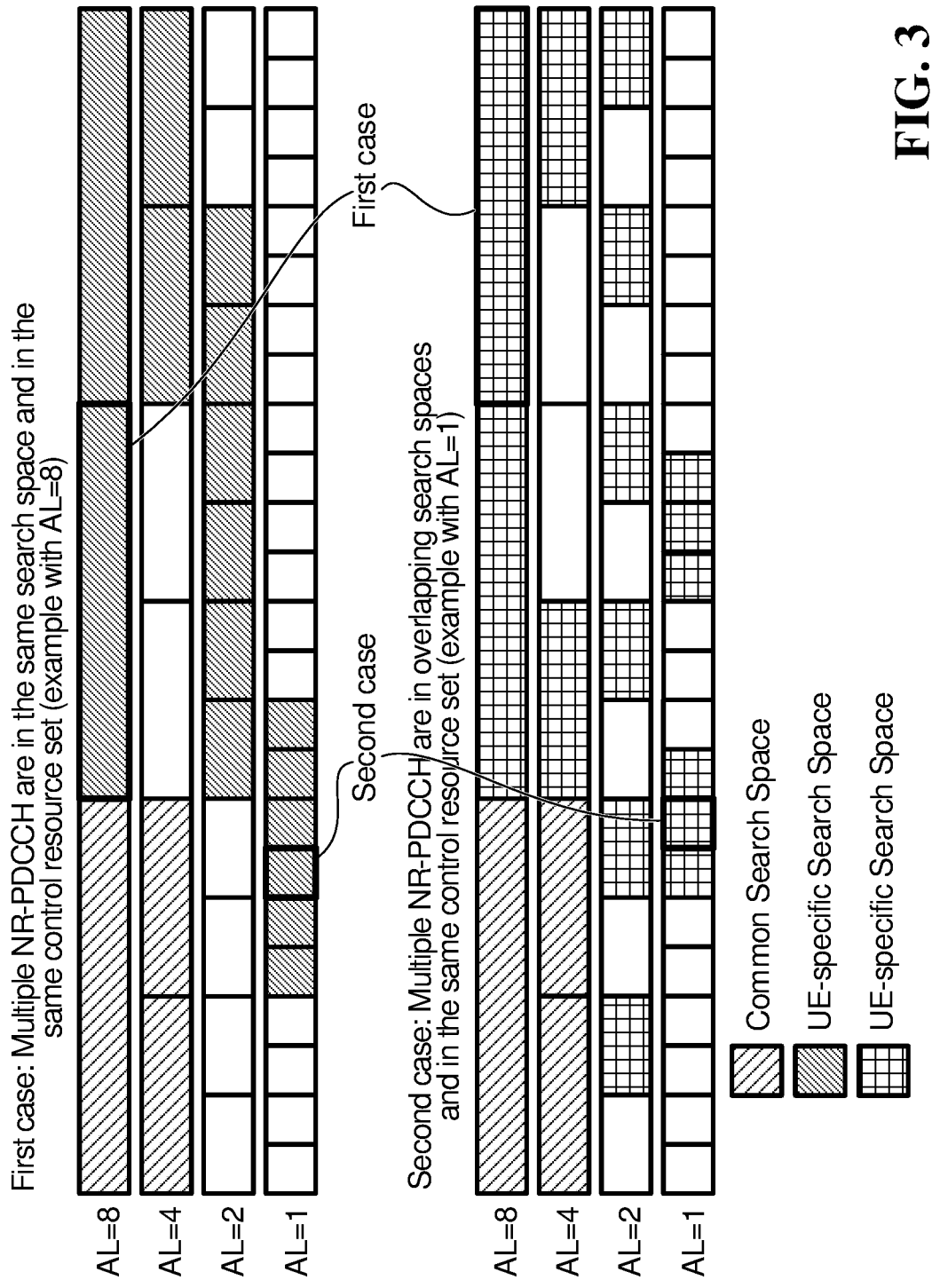
FIG. 3 is a diagram showing multiple PDCCH messages in the same or overlapping search spaces and in the same control resource set.

As noted above, there may be multiple PDCCH located in the same search space (fully/partially overlapped Time/Frequency (T/F) resources) or in multiple overlapping search spaces. This means that when performing blind detection to locate active PDCCH messages, PDCCH candidates may be fully overlapping, partially overlapping and/or non-overlapping. FIG. 3 is a diagram showing multiple PDCCH messages in the same or overlapping search spaces and in the same control resource set from two TRPs. In order to enforce non-overlapping PDCCH candidates, longer-term coordination between TRPs may be required. PDCCH messages are distinguished by different demodulation reference signals (DMRSs), e.g. orthogonal or low-correlated ones (in case of fully or partially overlapping).

Figure 4:
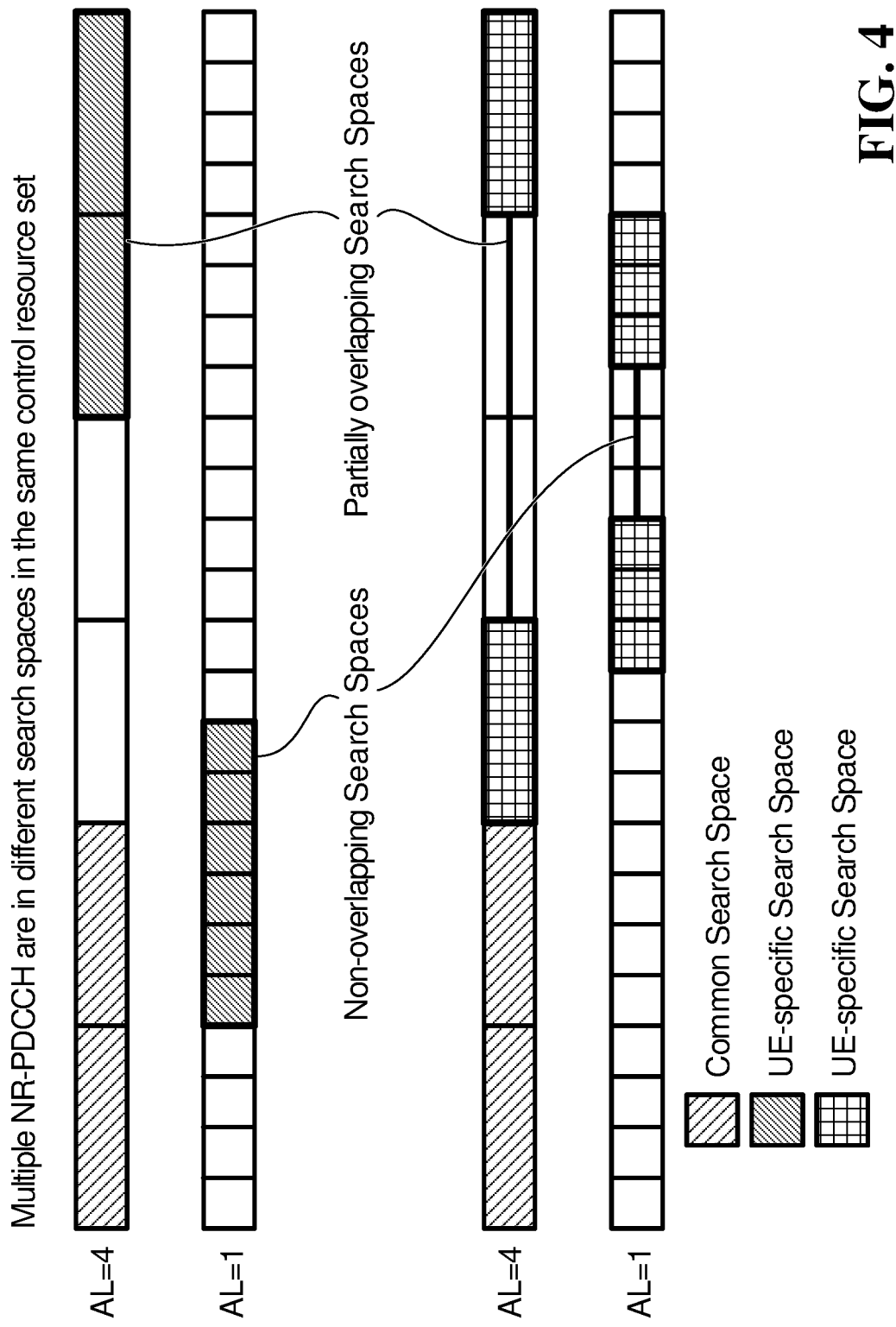
FIG. 4 is a diagram showing multiple PDCCH messages in different search spaces in the same control resource set.

In other cases, there may be multiple PDCCH messages in different search spaces or non-overlapping search spaces. In these cases, the search spaces may be in the same control resource set or in different control resource sets. In either scenario, the same or different DMRS may be used for different PDCCH messages. FIG. 4 is a diagram showing multiple PDCCH messages in different search spaces in the same control resource set.

If two or more search spaces are in the same control resource set, long-term coordination between TRPs may be used to make sure that different search spaces are not overlapping within the same control resource set. For example, there may be UE-specific pattern for search spaces for cooperating TRPs (e.g., pattern division of search spaces). As an example, a UE may be assigned different starting and/or ending of control channel elements (CCEs) for different search spaces, such that non-overlapping search spaces are achieved. The UE may use different IDs (e.g. multiple IDs similar to the cellular radio network temporary identifiers (C-RNTIs) used in cellular networks) to derive the resources/patterns for different search spaces associated with at least one NR-PDCCH/TRP. From the UE perspective, in general the UE does not need to know the origin of the PDCCH messages for each search space and is only required to know the associated search spaces and the RS pattern/sequence to decode them.

Apart from determining the control search space based on subframe and $Y_k$, where $Y_k$ is determined by the RNTI and slot index (as in LTE), other configured IDs associated with different search spaces can be used to identify different search spaces. For example, in some embodiments, if a UE needs to monitor/receive one/multiple PDCCH message(s), in 2 search space(s), then the resources or the CCEs corresponding to a PDCCH candidate associated with the two messages can be a function of RNTI and configured ID. As an illustrative example, in one embodiment one search space resource may be determined by RNTI, and another search space resource may be determined by a configured ID. The configured ID(s) can include same/different types of RNTI, i.e. C-RNTI, temporary C-RNTI, SPS C-RNTI, SI-RNTI, P-RNTI, RA-RNTI, TPC RNTI, M-RNTI as defined with the functions as in or similar to LTE. In many cases, the RNTI used to determine UE-specific search space resources is C-RNTI. In some embodiments, configured ID(s) may also be other C-RNTIs (i.e. the same type of RNTI) for the same UE. This is possible in the case of dual/multiple connectivity where a UE can have two/multiple RNTIs. Other types of UE-specific IDs can also considered as configured IDs, for example, EPDCCH configuration set ID(s), carrier component ID(s) used in carrier aggregation, or any IDs/parameters to distinguish different links in dual/multiple connectivity, or similar IDs that may be used to distinguish different entities. An ID common to a group of UEs can also be a configured ID. Also, different configured ID(s) can be used to distinguish resources of different common search spaces. In some embodiments, other parameters such as configured hierarchies between search spaces associated to given beams and/or TRPs can also be used to identify different search spaces.

In some embodiments, a UE informs the network of the maximum number of PDCCH it can monitor and/or receive (in case of different levels of UE capability is allowed by a standard specification). The UE performs blind detection on PDCCH candidates with configured aggregation levels over assigned search spaces. For example, for cell-edge UEs experiencing similar path-losses from multiple TRPs, the equivalent single-in-single-out (SISO) signal-to-interference-plus-noise ratio (SINR) for each of the multiple PDCCH is around 0 dB. In this case, higher aggregation levels can be used to demodulate those PDCCH from multiple TRPs. In contrast, for a UE experiencing imbalanced path losses from different TRPs, the UE may be configured for lower aggregation levels (e.g. 1, 2) to receive one PDCCH and higher aggregation levels (e.g. 4, 8, or even higher aggregation levels than those provided in LTE) to receive another PDCCH. This is instead of blindly detecting all possible aggregation levels (e.g. 1, 2, 4, 8 in LTE) for each PDCCH.

From the network perspective, in some embodiments the network transmits signaling to a UE to configure the number of multiple PDDCH messages that the UE should monitor and possibly receive. In general, this value should be configured so that it is less than or equal to the maximum number of PDCCH messages that the UE has informed the network it can receive (i.e. UE capability), which may depend, for example, on the number of radio frequency (RF) chains the UE has (e.g. in the high frequency (HF) case).

In some embodiments, the network also transmits signaling to the UE to configure a subset of aggregation levels in a UE-specific manner per control message search space to reduce the number of blind detections that the UE has to perform, e.g. reduce UE complexity with high-layer signaling by reducing the number of blind detections as well as reduce the number of blind detection false alarms (false alarms are typically linearly proportional to the number of blind detections performed).

In some embodiments, the network transmits signaling to the UE to configure a subset of candidates in a UE-specific manner per control message to reduce the number of blind detections that the UE has to perform. In such embodiments, multiple control messages may be in the same or different search space(s). The search space(s) can be UE-specific search spaces. From the UE perspective, the UE performs blind detection on single/multiple PDCCH with configured candidates over its assigned single or multiple search space(s). In this way, the UE can avoid performing blind detection on unconfigured candidates in assigned search space(s).

In some embodiments, two or more techniques to reduce the number of blind detections that the UE has to perform may be combined. For example, in some embodiments, the two techniques described, i.e., configured subset of aggregation levels and configured subset of candidates, may be combined to reduce the complexity of blind detection.

FIG. 5 is a diagram showing two examples of the configuration of subsets of PDCCH candidates on a per control message/DCI basis for multiple PDCCH messages corresponding to multiple PDCCH. In the first example shown in FIG. 5, two subsets of PDCCH candidates are configured for two control messages/DCIs corresponding to two PDCCHs (NR-PDCCH 1 and NR-PDCCH 2) in the same control resource set or search space (Control resource set or search space 1 with AL=4). In the second example shown in FIG. 5, two subsets of PDCCH candidates are configured for two control messages/DCIs corresponding to two PDCCHs (NR-PDCCH 1 and NR-PDCCH 2) in different control resource sets or search spaces (Control resource set or search space 1 with AL=4 and Control resource set or search space 2 with AL=4).

It is also possible to have an alignment of PDCCH generation rules/patterns among TRPs/multiple NR-PDCCH for the allowed aggregation levels and/or candidates with the same/different search space(s). For example, the information to align the rules/patterns may be known or exchanged between TRPs, e.g., using Xn interface. In some embodiments, the rules/patterns for the allowed aggregation levels and/or candidates can be changed in a semi-static manner.

In some embodiments, the configuration of subsets of aggregation levels or candidates is also done for common control messages and common control search spaces.

Beam Management

A UE may have multiple antenna beams for reception and/or transmission. On the network side, TRPs also may have multiple antenna beams for reception and/or transmission. A beam pair link is defined as a pair of Tx and Rx beamformers that are paired and tracked with respect to each other. Another possible way of defining a Beam Pair Link is as a pair of Transmit and Receive spatial filtering configurations that are tracked with respect to each-other. For example: the transmitter (resp. receiver) can perform a measurement based on some reference signal sent from an antenna port by the receiver (resp. transmitter) and select a given spatial filtering configuration based on the result of that measurement. In other words, the UE is supposed to maintain a spatial filtering configuration for each spatial filtering configuration on the network side corresponding to that UE.

Embodiments of the present disclosure provide mechanisms for the reception of K PDCCH messages over S PDCCH search spaces in P different beam pair links (BPLs). Note that multiple search spaces may fall within the same BPL. The same search space (and its contents) may repeat in multiple BPL (for robustness against BPL blocking). The number of concurrently monitored BPLs should be equal or less than the number of UE receive RF chains. More BPLs may be monitored in different time intervals (e.g., OFDM symbol-level).

For reliability in receiving multiple PDCCH from multiple TRPs, this scenario can be thought of as using NC-JT for multiple control messages where different performance improvement techniques such as beam-forming, inter-TRP interference coordination (ITIC), which is similar to the inter-cell interference coordination used in some cell-based networks, and link adaptation can be incorporated.

For example, in some embodiments, DMRS-based beamforming techniques are used to improve coverage and reliability.

With respect to power control and ITIC, in some embodiments TRPs apply power control and ITIC (as well as blanking) to improve the quality of multiple PDCCH demodulation. That is with different search spaces for a UE from different TRPs, each TRP increases the power that it transmits in its search space for a given UE, and reduces the power that it transmits in the search space(s) of neighboring TRP(s) for that UE. In some embodiments there are UE-specific patterns for search spaces for cooperating TRPs, e.g. the pattern division techniques described above.

With respect to link adaptation, this may be achieved, for example, via the use of different aggregation levels. For example, cell-edge UEs may use large aggregation levels. This may also help reduce the number of blind detections that a UE has to perform, because it may only perform blind detections on a subset of the possible aggregation levels as well as reduce false alarms.

UCI Transmission

Uplink control information (UCI), such as message acknowledgements, scheduling requests, and channel state information (CSI) is transmitted from a UE to TRP(s) on an uplink control channel (e.g. PUCCH).

In some embodiments, there is a one-to-one mapping between UCI and PDCCH in case of one or multiple PDCCH, in terms of number of Search spaces. In some embodiments, UL power control is used for UCI transmission.

For a power limited UE, there are various power control techniques that may be implemented. For example, symbol-level time division multiplexing (TDM) may be used so that UCI is still sent in the same TTI if that is a requirement. In other cases beam-based TDM may be used, and in other cases the available power may be proportionally assigned between different UCI.

Figure 6:
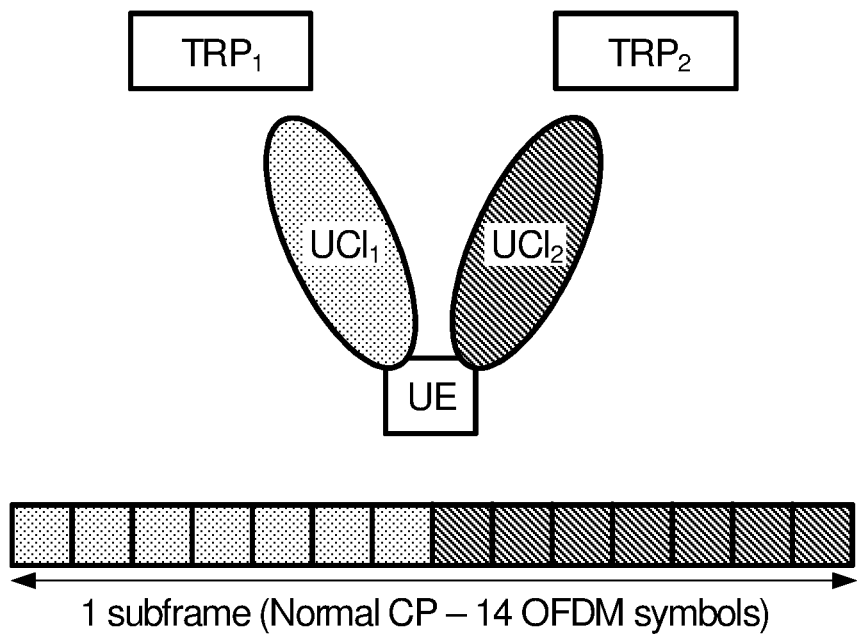
FIG. 6 is a block diagram showing an uplink transmission of UCI from a power limited UE to two TRPs for a 1-to-1 mapping of UCI and PDCCH.

FIG. 6 is a block diagram showing an uplink transmission of UCI from a power-limited UE to two TRPs for a 1-to-1 mapping of UCI and PDCCH. In this example, the UE received multiple PDCCH and is power limited. The UE transmits $UCI_1$ to $TRP_1$ in one beam and transmits $UCI_2$ to $TRP_2$ in a second beam. If the UE only has one TRF chain, the beams are time division multiplexed (TDM-ed), so that the first beam is sent on, e.g. OFDM symbols 0-6, and the second beam is sent on, e.g. OFDM symbols 7-13. Note that this example follows LTE that only the resource blocks for a PUCCH (carries UCI), in the lower portion of a control resource set is presented, because in general two set of resource blocks are in two slots on the two frequency edges of the control resource set (for time and frequency diversity). NR may use similar or different formats.

For a non-power limited UE, each UCI is transmitted using its own allocated power and the beams can be frequency division multiplexed (FDM-ed) or code division multiplexed (CDM-ed), and each beam can be allocated power individually and unequally. For CDM, different DMRSs (orthogonal or low correlation) would be required.

Figure 7:
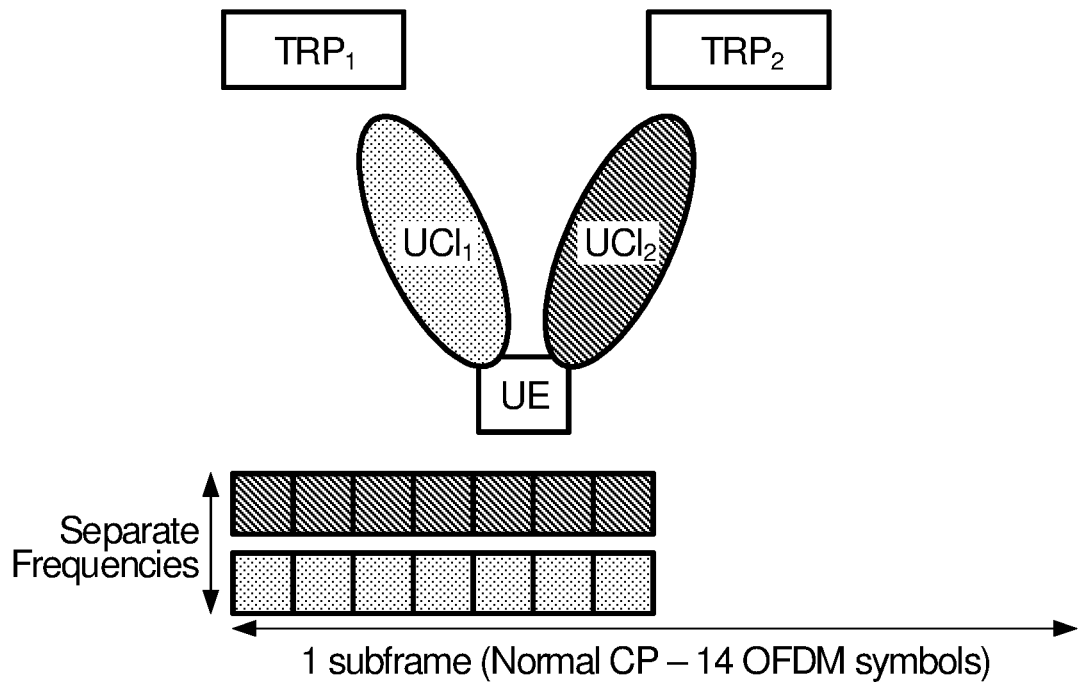
FIG. 7 is a block diagram showing an uplink transmission of uplink control information (UCI) from a non-power limited UE to two TRPs for a 1-to-1 mapping of UCI and PDCCH.

FIG. 7 is a block diagram showing an uplink transmission of uplink control information (UCI) from a non-power limited UE to two TRPs for a 1-to-1 mapping of UCI and PDCCH. In this example, the UE received one or multiple PDCCH and is not power limited. The UE transmits $UCI_1$ to $TRP_1$ in one beam and transmits $UCI_2$ to $TRP_2$ in a second beam.

In some embodiments, there is a many-to-one mapping between PDCCH and UCI in case of one or multiple PDCCH, in terms of number of Search spaces. In this scenario, the UE combines multiple UCI messages into a combined message and sends the combined message. UL power control may also be used for such many-to-one mapping scenarios. For example, the UE may use the power control mechanism for the combined UCI channel or may use higher power when the combined message is sent. From the network perspective, a network node (TRP) acts as the uplink control anchor node for the group of TRPs responsible for different PDCCH search spaces.

Figure 8:
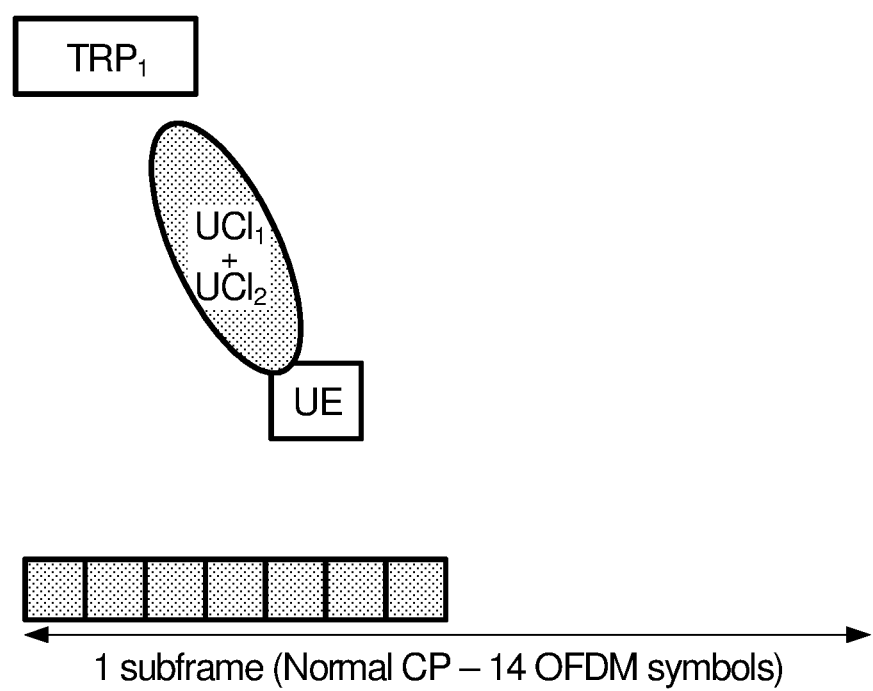
FIG. 8 is a block diagram showing an uplink transmission of UCI from a power limited UE to one anchor TRPs for a many-to-1 mapping of PDCCH and UCI.

FIG. 8 is a block diagram showing an uplink transmission of UCI from a power limited UE to one anchor TRPs for a many-to-1 mapping of PDCCH and UCI. In this example, the UE received one or multiple PDCCH and is power-limited. The UE transmits a combined UCI to $TRP_1$. If the combined UCI includes UCI for $TRP_2$, e.g. an $ACK/NACK_2$ for $TRP_2$, $TRP_1$ communicates $ACK/NACK_2$ to $TRP_2$. In this example, $TRP_1$ is the anchor node. The UE may use higher power to transmit the combined UCI.

Periodic/Aperiodic CSI Requests

TRPs may periodically and/or aperiodically request channel state information (CSI) from UEs. In some embodiments, UE-specific aperiodic CSI request patterns are used to identify which TRP in a group of cooperating TRPs can send a CSI request in which transmission time interval (TTI). In some embodiments, such a UE-specific pattern can be shared by all cooperating TRPs assigned to serve UEs in a longer term manner. In each TTI, there can be only one TRP can send request (or multiple if UE is able to handle them, up to the maximum UE capability). There may be multiple patterns, each for different cooperating set sizes. Hence if the number of cooperating size changes, the pattern has to be updated at cooperating TRPs.

Figure 9:
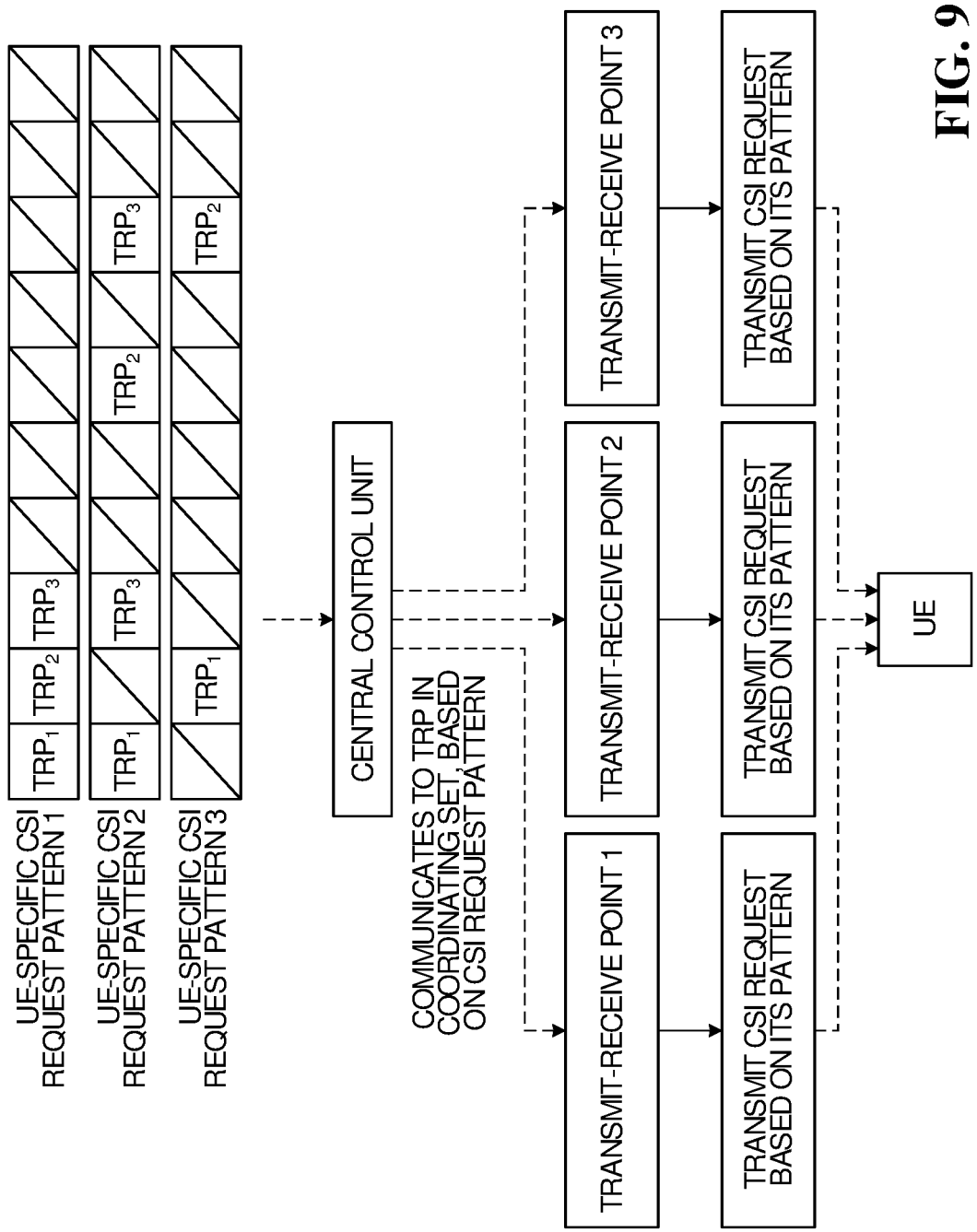
FIG. 9 is a diagram showing the transmission of channel state information (CSI) requests from multiple TRPs to a UE using a first example of an aperiodic CSI request pattern.

FIG. 9 is a diagram showing the transmission of channel state information (CSI) requests from multiple TRPs to a UE using a first example of an aperiodic CSI request pattern. In this example, UE-specific aperiodic CSI request patterns (pattern is defined for 10 subframes in this example) are defined where only 1 TRP can send a CSI request in a given subframe. A Central Control Unit (CCU) has knowledge of the UE-specific CSI request patterns. The CCU shares it with the cooperating TRP set (2 TRPs or 3 TRPs in this example). This mechanism inherently ensures only 1 TRP can ever send 1 CSI request per subframe.

Figure 10:
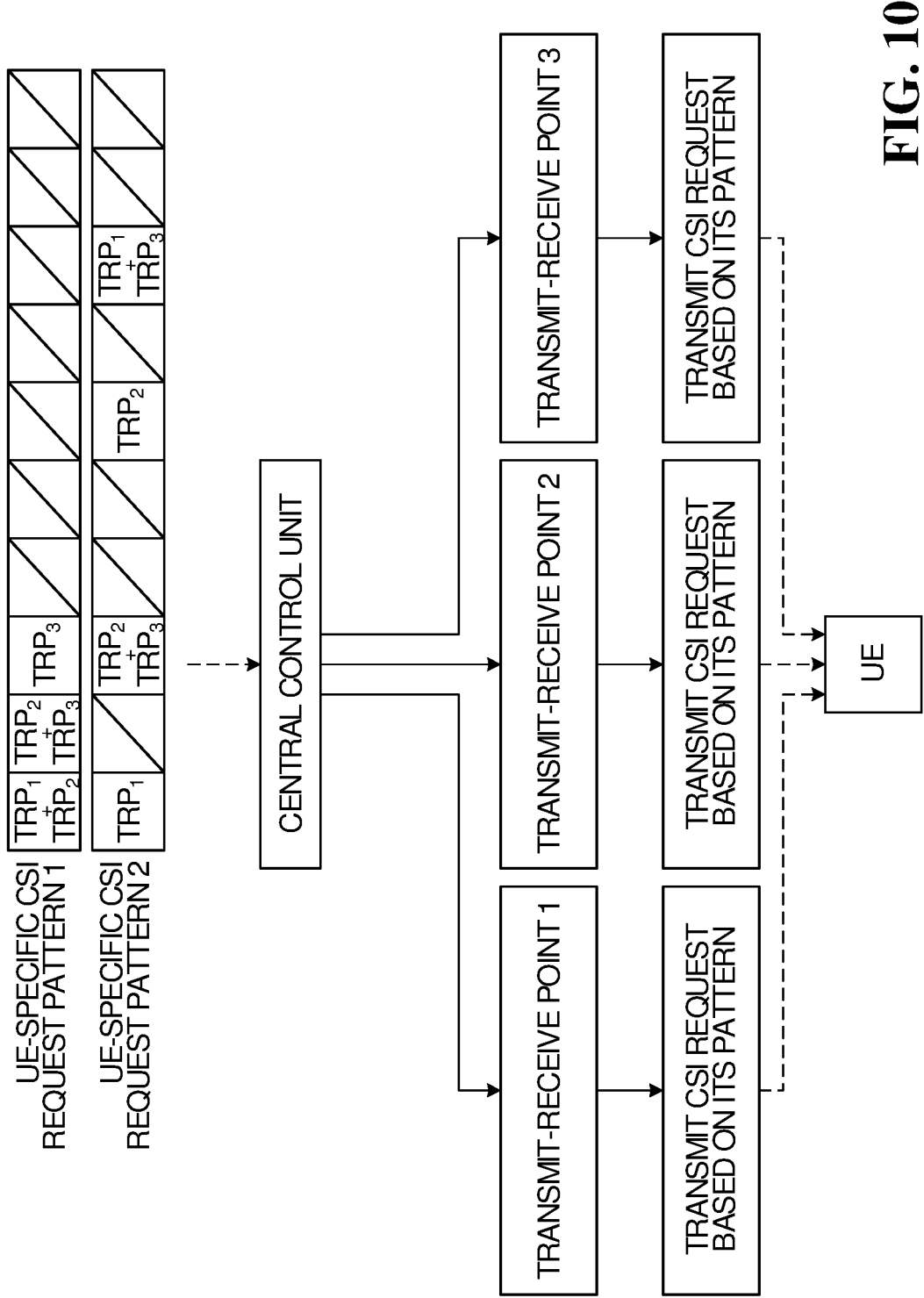
FIG. 10 is a diagram showing the transmission of channel state information (CSI) requests from multiple TRPs to a UE using a second example of an aperiodic CSI request pattern.

FIG. 10 is a diagram showing the transmission of channel state information (CSI) requests from multiple TRPs to a UE using a second example of an aperiodic CSI request pattern. In this example, UE-specific aperiodic CSI request patterns (pattern is defined for 10 subframes in this example) are defined where up to 2 TRPs can send a CSI request in a given subframe (only 2 TRPs in this example but it can be more than 2, this will depend on the UE capability). Here again a CCU has knowledge of the UE-specific CSI request patterns and shares it with the cooperating TRP set (3 TRPs in this example). Higher UE capability is needed as UE has to service more than 1 CSI request.

In some embodiments, there is a set of UE-specific aperiodic CSI request patterns such that the CSI cannot be requested at the same time in different patterns (so as not to exceed UE capability). In this scenario, there can be long-term coordination between TRPs on which patterns to use, this is transparent to the UE. Each TRP is only required to know the pattern associated to that TRP and only for the UEs associated with them. If there is concurrent aperiodic CSI requests due to multiple PDCCH, a UE may process one request via one UCI, and send the rest (associated with other UCIs) the expected time to receive, e.g. 1, 2 TTIs later, or drop some of the requests based on certain defined rules by standard specification.

Figure 11:
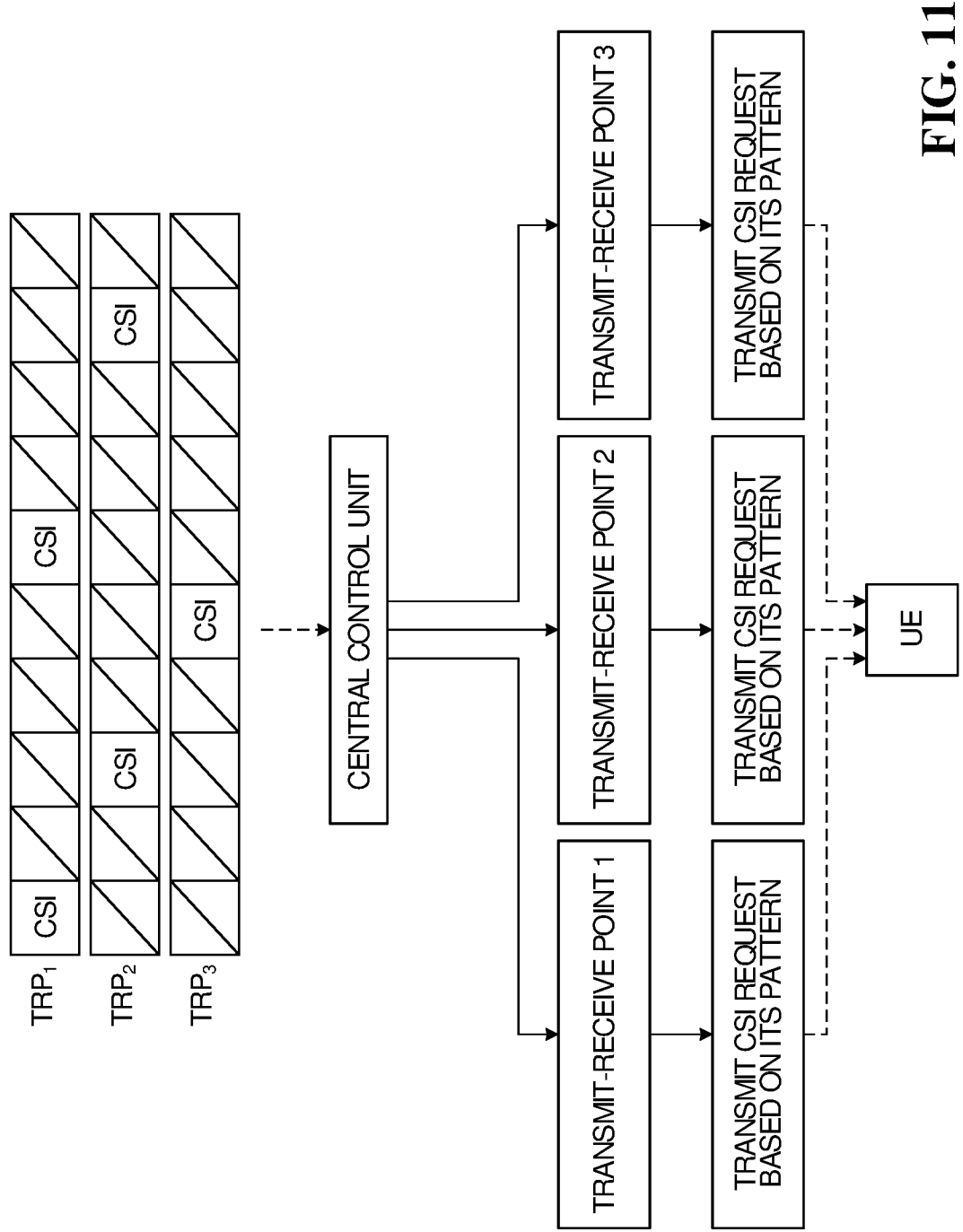
FIG. 11 is a diagram showing the transmission of channel state information (CSI) requests from multiple TRPs to a UE using a first example of a set of aperiodic CSI request patterns.

For example, FIG. 11 is a diagram showing the transmission of channel state information (CSI) requests from multiple TRPs to a UE using a first example of a set of aperiodic CSI request patterns. In this example, UE-specific aperiodic CSI request patterns (pattern is defined for 10 subframes in this example) are defined for each TRP. A CCU has knowledge of the UE-specific CSI request patterns. Each TRP knows only its pattern, in which aperiodic CSI request TTIs are defined. Then, if there are more TRPs added in the cooperating set of the UE, then those TRPs are assigned with their patterns, and the existing TRPs may or may not update their pattern. Long-term coordination between TRPs is used to ensure CSI patterns don't collide.

Figure 12:
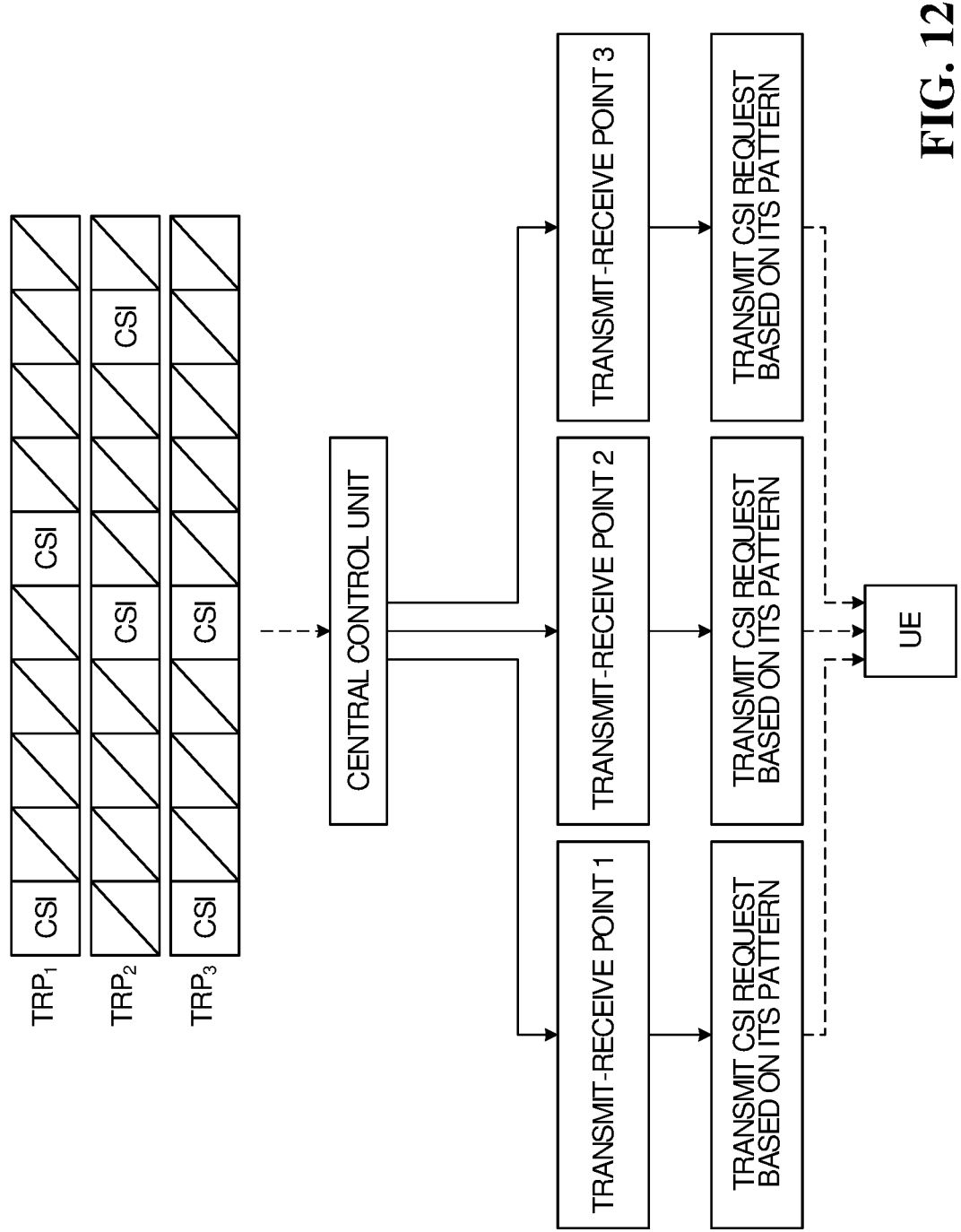
FIG. 12 is a diagram showing the transmission of channel state information (CSI) requests from multiple TRPs to a UE using a second example of a set of aperiodic CSI request patterns.

FIG. 12 is a diagram showing the transmission of channel state information (CSI) requests from multiple TRPs to a UE using a second example of a set of aperiodic CSI request patterns. In this example, UE-specific aperiodic CSI request patterns (pattern is defined for 10 subframes in this example) are defined for each TRP. Here again a CCU has knowledge of the UE-specific CSI request patterns and each TRP knows only its pattern, in which aperiodic CSI request TTIs are defined. For higher UE capability, UE-specific CSI request patterns may be configured with collisions, i.e. higher UE capability is needed as UE has to service more than 1 CSI request. For example, in the example shown in FIG. 12 $TRP_1$ and $TRP_3$ could potentially both transmit a CSI request in the first subframe. Similarly, $TRP_2$ and $TRP_3$ could potentially both transmit a CSI request to the UE in the fifth subframe.

UL/DL Time Domain Duplexed Transmission

In some embodiments, TTI-based (i.e. TDD) UE patterns are used to schedule UL and DL transmissions for UEs. The TTI-based UE patterns are UE-specific. In some embodiments, each UE has its own frame structure (basically the UL/DL pattern) but TRPs do not have a specific UL/DL pattern and can dynamically choose their UL/DL direction as load changes. With this design, it is possible to avoid scenarios in which one TRP schedules a UE in DL and another in UL in the same TTI. If such UE specific patterns are used, the UE-specific pattern would be part of UE related information at the network side and all TRPs assigned to serve UEs should know the pattern for each UE that it is serving.

Figure 13:
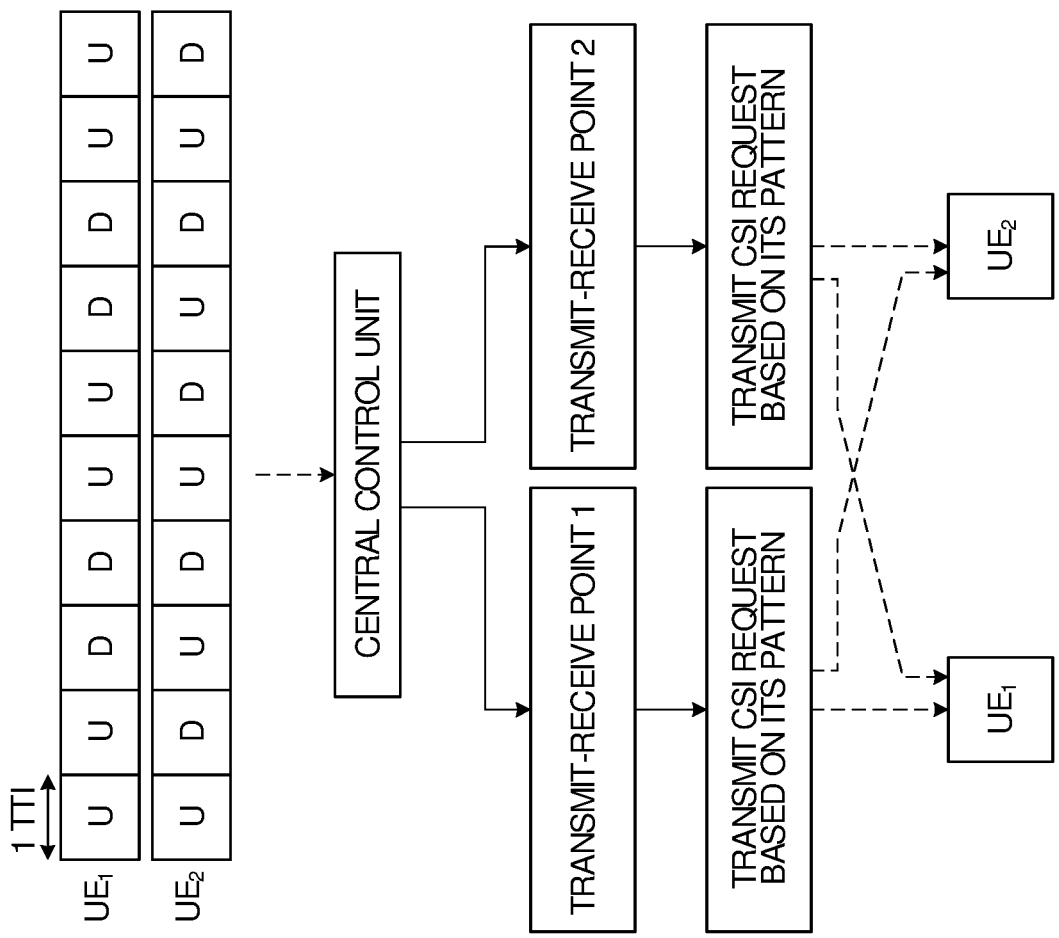
FIG. 13 is a diagram showing UE scheduling for multiple UEs using UE-specific UL/DL time domain duplexing (TDD) patterns.

FIG. 13 is a diagram showing UE scheduling for multiple UEs using UE-specific UL/DL TDD patterns. In this example, the patterns are defined for each UE on a frame structure (U: Uplink; D: Downlink; 1 frame=10 subframes; 1 subframe=1 TTI). A CCU has knowledge of UE patterns and transmits them to its TRPs. Scheduling is performed based on each UE's UL/DL pattern.

DCI Content

In some embodiments, the content of the DCI carried in PDCCH messages may include, in addition to the LTE DCI content for different DCI formats, additional content such as one or more of DMRS information for PDSCH(s), resource assignment information and HARQ/retransmission assignment information.

With respect to DMRS information for PDSCH(s):
 For transmission of a single PDCCH message corresponding to a single PDSCH from a single or multiple TRP(s)/beam(s)/panel(s) sent in TDM manner, there can be only one DMRS resource/pattern for a UE. The network uses the same or different DMRSs for different UEs.
 For transmission of a single PDCCH message corresponding to multiple PDSCHs from multiple TRPs/beams/panels, resource assignment in PDSCH can be non-overlapping, partial or fully overlapping. Non-overlapping or partial overlapping is only possible if the PDCCH message contains multiple resource assignment fields. In case of partial or fully overlapping resources, there should be different DMRSs for different PDSCHs.

For transmission of multiple PDCCH messages corresponding to multiple PDSCHs from multiple TRPs/beams/panels, there can be:

different DMRSs for different PDSCHs if the PDSCHs are overlapped in resources;

The same or different DMRs can be used for different PDSCHs if the PDSCHs are in non-overlapped in resources; or Different PDCCHs from different TRPs can use different aggregation levels (depending on UE-TRP link qualities) within the same or different search spaces. For a low UE-TRP link quality (e.g. low SINR), then a higher aggregation level can be used, while for a high link quality (e.g. high SINR), then a lower aggregation level can be used. Though in general, UE-specific cooperating TRPs may not have much different link qualities to the UE.

In some embodiments, from the network perspective, the network uses the same or multiple DMRSs for a UE, and uses the same or different DMRSs for different UEs. From the UE perspective, upon receiving the same or multiple DMRSs, a UE can obtain channel estimate(s) for decoding a single or multiple PDSCHs.

With respect to resource assignment information:

For transmission of a single PDCCH message for multiple PDSCHs, DCI carried by a PDCCH message can have either a single resource assignment field or multiple resource assignment fields. For a single resource assignment field, the resources of multiple PDSCHs are fully overlapped. With multiple fields for resource assignments with one-to-one or one-to-many correspondence to PDSCHs, then the assigned resource for multiple PDSCHs can be partially overlapped, fully overlapped, or non-overlapped.

For transmission of multiple PDCCH messages for multiple PDSCHs, there can be one-to-one or one-to-many correspondent between PDCCH messages and PDSCHs, and the assigned resource for multiple PDSCHs can be partially overlapped, fully overlapped or non-overlapped.

In some embodiments, from the network perspective, the network can assign the fully/partially/non-overlapped resources for multiple PDSCHs. From the UE perspective, with the information on fully/partially/non-overlapped resources for multiple PDSCHs, the UE can use a linear or non-linear receiver to decode the data.

With respect to HARQ assignment information:

HARQ processes may be pre-assigned among cooperating TRPs when the PDCCH messages are in the same or different search space. The scheduling can be done at cooperating TRPs locally (i.e. distributed scheduling) and each TRP that schedules the UE is responsible to send DCI and the corresponding control HARQ process. In such case, HARQ processes are pre-assigned among cooperating TRPs. For example, HARQ processes 0-3 and 4-7 are assigned to TRP1 and TRP2, respectively, by the network. Such TRPs are responsible for new and retransmission of corresponding packets sent from the TRPs. There is no data sharing required between TRPs, as the retransmission is done at the same TRP that sends the original new packet. This option is less flexible in terms of # of HARQ process at a TRP, but the scheduling and control channel transmission can be done in a distributed manner. From the network perspective, the network assigns a subset of HARQ processes to each TRP/beam (in a semi-static manner). From the UE perspective, a UE follows the instructions provided in the DCI and does not need to know the HARQ assignment to TRP/beam.

Alternatively, HARQ processes may be shared among cooperating TRPs and dynamically assigned by a centralized controller. This option may be used when the PDCCHs are in the same or different search space. The scheduling can be done at cooperating TRPs locally (i.e. distributed scheduling), and the scheduling decisions are sent to the controller. This however, requires the scheduling to be done in advance such that the controller can collect all DCIs. Alternatively, the scheduling can be done at the central controller. The centralized controller is responsible to assign the TRPs/beams that transmit DCIs and assign/control HARQ processes for cooperating TRPs. The new and retransmission still takes place from the same TRP. There is no data sharing required between TRPs, as the retransmission is done at the same TRP that sent the original packet. This option is more flexible in assigning HARQ process to a TRP, but there may be an extra delay because the control channel transmission is done at the centralized controller (even though the distributed scheduler can be done). There is an option that different TRPs can retransmit failed packet from each other, which would require data sharing between TRPs. From the network perspective, the network dynamically assigns HARQ processes to each TRP/beam. From the UE perspective, a UE follows the instructions provided in the DCI and does not need to know the HARQ assignment to TRP/beam.

In another scenario, HARQ processes are assigned to cooperating TRPs independently. This option is used when the PDCCHs are in different search space. The scheduling can be done at cooperating TRPs locally (i.e. distributed scheduling), and each TRP sends DCI(s) to its scheduled UE(s) (which may be preferred in most cases). Alternatively, the scheduling can be done at the central controller, but the scheduling decision is sent to transmitting TRPs, which each sends DCI to its serving UE. Each transmitting TRP is responsible to transmit its own DCI and have independent HARQ processes, e.g. each TRP can use HARQ processes 0-7 independently. This is possible since PDCCHs are in different search space. The new and retransmission still takes place from the same TRP. There is no data sharing required between TRPs, as the retransmission is done at the same TRP that sent the original packet. This option is more flexible in using independent HARQ processes at each TRP. From the network perspective, each TRP/beam is assigned a certain channel for PDCCH and will contain all the instructions within that channel. No cross-channel instruction is sent. From the UE perspective, a UE maintains two or more connections and follows the instructions in each channel independently.

ACK/NACK Channels

In some embodiments, there is one Acknowledgement/Negative Acknowledgement (ACK/NACK) bit for each codeword (CW) in one or multiple DCI(s). The order of ACK/NACK bits correspond to the order of DCIs and CWs within the DCIs. For example, if there are 2 DCIs each having 2 CWs, then there are 4-bit ACK/NACK, where the first bit corresponds to the first CW in the first DCI, while the second bit is for the second CW of the first DCI, and so on.

Note that the order of DCIs can be obtained from the indexes of the first Control Channel Element of the DCI.

In some embodiments, there is one ACK/NACK bit for multiple codewords from one or multiple DCIs. For example, if there are 2 DCIs, each having 1 CW, but there is only 1 ACK/NACK bit, then ACK is obtained only when the two CWs from 2 DCIs are decoded correctly, and NACK is obtained if either of the CWs are wrongly decoded.

In some embodiments, from the UE perspective, a UE follows the instructions to send ACK/NACK corresponding to the CW in the same or different DCI messages. From the network perspective, the network directs the corresponding ACK/NAK bit to the responsible TRP for HARQ retransmission.

Signaling

Within the network (e.g., central controller to TRP or between TRPs) the following may be done through backhaul and X2 signaling:
- Scheduling decisions (e.g. for centralized scheduler)
- The allocation of HARQ processes between cooperating TRPs
- Data flow assignment to multiple TRPs
- Sharing data, CSI (feedback information), Ack signaling
- UE-specific aperiodic CSI request pattern
- UE-specific UL/DL TTI-based pattern
- Non-overlapped search spaces coordination and DL power control in those search spaces used by different TRPs
  - Use in interference avoidance
  - ITIC together with power control
  - There can be a UE-specific pattern for search spaces which is known to cooperating TRPs
- PDCCH generation rules/patterns among TRPs/multiple NR-PDCCH for the allowed aggregation levels and/or candidates with the same/different search space(s)

From the network to the UE, the following may be done through higher-layer signaling:
- PDCCH search spaces
  - If there is one search space, then max number of DCIs should be signaled to UE
- DMRS information (e.g. resources, patterns) for PDCCHs
- Maximum number of DCIs per search space (if not specified in the standard)
- ACK/NAK configuration related to different DCIs and different codewords in one DCI (if not specified in the standard)
- HARQ mechanism (if multiple HARQ process sets are supported)
- Control resource set
- Control search spaces
  - including subframe, RNTI, slot index used in LTE, other configured IDs corresponding to different search spaces with multiple PDCCH and other configured hierarchies associated to given beams and/or TRPs corresponding to different search spaces. The multiple PDCCH can be transmitted from one or multiple TRPs
- The relation of control resource sets and search spaces for UE to identify T/F resources
- The maximum number of PDCCH (K) that UE expects to receive, K<=Pu, where Pu is the maximum number of PDCCH that the UE can receive
- The UE-specific subset of aggregation levels per PDCCH or each of multiple PDCCH, which can be associated with/by the same or different search space(s).

From the network to the UE, dynamic signaling may be used to communicate DCI contents (as discussed above).

From the UE to the network, the UE signals the ACK/NACK corresponding to CWs in DCIs (as per instruction and standardization). In some embodiments the UE may also signal the maximum number of PDCCH (Pu) that the UE can receive.

Standard Specification

It is possible that the following parameters/procedures will be specified in the standard for NR:
- Search spaces/DMRS for PDCCH, including the maximum number of search spaces and possible options, and the signaling for parameter setting;
- DCI configuration, such as the maximum number of DCIs and signaling;
- DCI content, such as defining possible DCI formats; and
- ACK and HARQ mechanism.

Transmission Schemes for Control Channel

Various transmission schemes may be used for the physical downlink control channel to potentially improve coverage. For example, single or multiple PDCCH messages can be coordinated transmission schemes (e.g. DPS, NC-JT) to improve coverage using DPS or non-coherent JT to transmit the PDCCH messages. For example, in some embodiments, PDCCH messages may be transmitted using DPS with a dynamically selected TRP/beam/panel (e.g. based on channel quality) used to transmit single or multiple PDCCHs using transmit diversity or Spatial Multiplexing (SM) schemes.

In other embodiments, PDCCH messages are transmitted using non-coherent JT with: transmit diversity schemes (e.g. SFBC, precoder-cycling, etc.) across multiple TRPs/beams/panels for one PDCCH message; transmit diversity, each for different PDCCH messages from different TRPs; SM transmission to transmit different PDCCH messages from the same or different TRPs/beams/panels; or a hybrid scheme, where some PDCCH messages are each transmitted using a transmit diversity scheme across multiple TRPs/beams/panels, and other PDCCH messages are each transmitted using a transmit diversity or SM from the same or different TRPs/beams/panels In some embodiments, DMRS-based beamforming is used to improve the coverage.

In some embodiments, multiple aggregation levels are used for different UE's condition, e.g. cell-edge UE can use higher aggregation level.

In some embodiments, a combination of the above options is used.

Data Flow Assignment

An embodiment of the present disclosure provides a method to assign data flow to multiple TRPs serving the same UE. UEs can be served by a set of TRPs. To reduce the coordination requirement between different TPs in the scheduling, those TPs send independent data to the UE. Those independent data can be obtained by following three options (or a combination of them).
- Independent data: data belong to independent data streams=>no data sharing
- Split data: data belong to the same data flow but is split. e.g. one TP is responsible for 60% of a packet and the other for the remaining 40%=>no/limited data sharing
- Fountain code: all TPs send the same data flow and each send a fountain code stream from that flow. In this scenario, the transmission by all TPs continues until enough fountain packets arrive at the user=>data sharing and only applicable to delay tolerant data flow.

DMRS for Control Channels

A set of DMRSs can be pre-defined for a control channel (e.g. PDCCH). The set may be signaled by high-layer signaling to a UE for blind detection. Different sets can be used for different UEs, search spaces, system bandwidths (BWs). For different UEs in non-overlapped search spaces, the DMRS configuration can be the same. In some embodiments, the set is changed semi-statically.

Applicability

Aspects of the present disclosure are applicable to multiple TRPs that operate in the same or different bands, carrier frequency and BW. Although the foregoing discussion has been primarily in the context of transmitting single/multiple PDCCH message(s) for single/multiple PDSCH(s), aspects of the present disclosure are also applicable to aspects of transmitting single/multiple PUCCH message(s) for single/multiple PUSCH(s) in terms of:

DMRS for control and data channels;
PUCCH search spaces;
DCI content for UL grant, such as:
  DMRS assignment;
  Resource assignment;
  HARQ information;
ACK/NACKs;
Transmission schemes for UL control channel.

Distributed Non-Coherent JT Coordinated Transmission

An embodiment to support distributed NC-JT coordinated transmission involves multiple PDCCH messages sent from multiple TRPs, conveying instructions for multiple PDSCH data streams from multiple TRPs.

Multiple PDCCH messages (or DCIs) can be transmitted in different search spaces using the same or different DMRS. Different PDCCH messages can convey either fully/partial/non overlapped resource assignment (since no short term coordination is done, the assignment may randomly overlap). HARQ processes are divided between the TRPs in a semi-static manner (longer term cooperation) and each TRP independently manages the assigned HARQ processes. There is no coordination required between TRPs. Each TRP is responsible for fulfilling the HARQ transmission of processes associated with that TRP.

Multiple PDCCH messages can be transmitted in different beam directions. If a UE has multiple RF receive chains, then different UE receive beam directions have to be done at the same time.

In some embodiments, independent ACK/NACK bits are transmitted for different CWs from different DCIs. The order of ACK/NACK bits corresponding to the order of search spaces, then DMRS configurations, then the order to DCIs (based on the first CCE index), then the order of CWs in the DCI.

The transmission scheme used for the control channel is a local diversity scheme for each DCI from each TRP.

The data flow assignment to multiple TRPs provides independent data streams from different TRPs.

Centralized Non-Coherent JT Coordinated Transmission (Option 1)

A first option to support centralized non-coherent JT coordinated transmission involves multiple PDCCH messages sent in one search space, conveying an instruction for multiple PDSCH data streams from multiple TRPs.

Multiple PDCCH messages are transmitted in one search space (one TRP or multiple TRP where the UE does not need to know the difference), making the PDCCH search space only a single search space. Different PDCCH messages can convey either fully/partial/non overlapped resource assignment. HARQ processes between TRPs can be pre-assigned or dynamically assigned, but shared among the TRPs. For a UE with single RF chain, a single UE Rx beam can be used, if multiple PDCCH messages are sent from the same TRP, or different UE Rx beams, one at time, can be used if multiple PDCCH messages are sent from different TRPs. For a UE with multiple RF chains, different UE Rx beams can be used at the same time to receive multiple PDCCH messages from multiple TRPs.

In some embodiments, independent ACK/NACK bits are transmitted for different CWs from the same DCI.

Within the network, scheduling decisions are signaled from a central controller to different TRPs.

In some embodiments, the transmission scheme used for the control channel is a local diversity scheme for the DCIs from one anchor TRP or distributed diversity through multiple TRPs.

The data flow assignment to multiple TRPs provides multiple data stream from different TRPs.

In terms of HARQ, the same TRP sends retransmission for a packet originally sent by each TRP.

Centralized Non-Coherent JT Coordinated Transmission (Option 2)

A second option to support centralized non-coherent JT coordinated transmission involves multiple PDCCH messages sent in one search space, conveying an instruction for one PDSCH data stream from multiple TRPs.

Again, multiple PDCCH messages are transmitted in one search space (one TRP or multiple TRP where the UE does not need to know the difference), making the PDCCH search space a single search space, and different PDCCH messages can convey either fully/partial/non overlapped resource assignment. Similar to the first option, HARQ processes between TRPs in this second option can be pre-assigned or dynamically assigned, but shared among the TRPs. For a UE with single RF chain, a single UE Rx beam can be used, if multiple PDCCH messages are sent from the same TRP, or different UE Rx beams, one at time, can be used if multiple PDCCH messages are sent from different TRPs. For a UE with multiple RF chains, different UE Rx beams can be used at the same time to receive multiple PDCCH messages from multiple TRPs.

In some embodiments, independent ACK/NACK bits are transmitted for different CWs from the same DCI.

Within the network, scheduling decisions are signaled from a central controller to different TRPs.

In some embodiments, the transmission scheme used for the control channel is a local diversity for the DCIs from one anchor TRP or distributed diversity through multiple TRPs.

The data flow assignment to multiple TRPs provides the same data stream from different TRPs.

In terms of HARQ, a different TRP may send retransmission for a packet originally sent by another TRP.

Example Embodiments

For illustrative purposes, several example embodiments of aspects of the present disclosure are described below. These examples are provided for illustrative purposes only, and are not to be taken as limiting.

In some embodiments, in order to realize independent resource scheduling and avoid the impact of backhaul conditions, each coordinated TRP can send its own NR-PDCCH to the same UE independently. In this case, the UE needs to monitor and receive multiple NR-PDCCH to decode different layers from different TRPs. As multiple NR-PDCCH can be designed using the same DCI format and different TRPs can use the same UE's search space to transmit the NR-PDCCH, the number of PDCCH candidates and the UE complexity of blind detection will not be increased. Considering the coverage of NR-PDCCH, different TRPs can use different aggregation levels. For example, the coordinated TRP can use a high aggregation level to transmit its NR-PDCCH. Moreover, DMRS-based demodulation can reap the benefit of beamforming gain, especially for the UE-specific NR-PDCCH.

In some embodiments, multi-point coordinated transmission based on non-coherent JT with distributed scheduling may be supported, wherein each TRP schedules its UEs independently without sharing feedback information and scheduling decisions within the cooperating set. Therefore, a UE can be scheduled with independent codewords from multiple TRPs. Since an ideal backhaul link may not always exist, non-ideal backhaul seems like a more practical assumption.

With such distributed and independent resource scheduling from multiple TRPs, multiple independent and concurrent control information can be sent to the same UE from multiple TRPs within the same carrier, potentially indicating different time-frequency resource allocations for each codeword. Therefore, a UE can receive more than one control information corresponding to multiple codewords potentially communicated to/from multiple TRPs.

In some embodiments, NR may support the reception of more than one control information corresponding to multiple codewords scheduled to a given UE within the same carrier.

Embodiment: Single PDCCH
  Scheduling mechanism for Single PDCCH for
    Single NR-PDSCH data stream(s) from single or multiple TRPs or different PDSCHs from multiple TRPs
      Centralized scheduling
        TRPs in cooperating or measurement set send feedback (e.g. CSI/CQI reports) to centralized controller/anchor/master TRP (e.g. highest Reference Signal Received Power (RSRP)) and is responsible for scheduling. The centralized controller then assign a TRP to transmit scheduling decision, i.e. control instructions.
        Centralized controller/Anchor/master TRP
          perform a scheduling based on the feedback and send the scheduling decision to either all TRPs in the set or only TRPs in the transmitting set. The centralized controller then assign a TRP (e.g. anchor/master TRP) to transmit scheduling decision, i.e. control instructions.
          An assigned TRP sends a single PDCCH to a scheduled UE, even though the UE is scheduled by single or multiple TRPs
          It is also possible to send a single PDCCH corresponding to PDSCH for a TRP in TDM manner, i.e. use multiple TTIs, each for one PDCCH associated with one TRP is sent.
      Distributed scheduling
        Each TRP in a cooperating set
          schedule its own UEs independently based on its UEs' feedback
          Report scheduling decision to the anchor/master TRP
        Anchor/master TRP or a TRP
          Generate/Send a single PDCCH to a scheduled UE, even though the UE is scheduled by single or multiple TRPs
          It is also possible to send a single PDCCH corresponding to PDSCH for a TRP in TDM manner, i.e. use multiple TTIs, each for one PDCCH associated with one TRP is sent.

Scheduling mechanism for Single PDCCH
  Pros:
    Low signaling overhead/resource Embodiment: Multiple PDCCHs from the Same TRP Multiple PDCCHs from the same TRP
  Centralized scheduling
    TRPs in cooperating or measurement set send feedback (e.g. CSI/CQI reports) to centralized controller/anchor/master TRP (e.g. highest RSRP) and is responsible for scheduling. The centralized controller then assign a TRP to transmit scheduling decision, i.e. control instructions.
    Centralized controller/Anchor/master TRP
      perform a scheduling based on the feedback and send the scheduling decision to either all TRPs in the set or only TRPs in the transmitting set. The centralized controller then assign a TRP (e.g. anchor/master TRP) to transmit scheduling decision, i.e. control instructions.
      The assigned TRP sends multiple PDCCHs to a scheduled UE, if the UE is scheduled by multiple TRPs
        There can be one-to-one correspondent of PDCCHs and PDSCHs from multiple TRPs
        There can be one-to-many correspondent of PDCCHs and PDSCHs from multiple TRPs
  Distributed scheduling
    Each TRP in a cooperating set
      schedule its own UEs independently based on its UEs' feedback
      Report scheduling decision to the anchor/master TRP
    Anchor/master TRP or a TRP
      Send multiple PDCCHs to a scheduled UE, if is scheduled by multiple TRPs
        There can be one-to-one correspondent of PDCCHs and PDSCHs from multiple TRPs
        There can be one-to-many correspondent of PDCCHs and PDSCHs from multiple TRPs
  PDCCH resources multiplexing,
    Orthogonal (i.e. non-overlapped) resources, with TDM, FDM, CDM
    Non-orthogonal (partial or fully overlapped) resources with different DMRSs, or with different DMRSs and using non-orthogonal multiple access (NOMA) (with power domain multiplexing) or Sparse Code Multiple Access (SCMA) (with power and code domains multiplexing). With NOMA and SCMA, an advanced receiver such as e.g. SIC, message passing algorithm (MPA), SIC-MPA, MLD, can be used.
Multiple PDCCHs from the same TRP
  Pros:
    More flexibility in terms of
      Different resources of PDSCHs from different TRPs can be used Embodiment: Multiple PDCCHs from Different TRPs Multiple PDCCHs from different TRPs
  Centralized scheduling
    TRPs in cooperating or measurement set send feedback (e.g. CSI/CQI reports) to centralized controller/anchor/master TRP (e.g. highest RSRP) and is responsible for scheduling. The centralized controller then assign a TRP to transmit scheduling decision, i.e. control instructions.

Centralized controller/Anchor/master TRP
- perform a scheduling based on the feedback and send the scheduling decision to either all TRPs in the set or only TRPs in the transmitting set. The centralized controller then assign a TRP (e.g. anchor/master TRP) to transmit scheduling decision, i.e. control instructions.

Each TRP in transmitting set
- Send independent PDCCH to each scheduled UE

Distributed scheduling
- Each TRP in a cooperating set
  - schedule its own UEs independently based on its UEs' feedback
  - Send independent PDCCH to each scheduled UE PDCCH resources multiplexing,
- Orthogonal (i.e. non-overlapped) resources, with TDM, FDM, CDM
- Non-orthogonal (partial or fully overlapped) resources with different DMRSs, or with different DMRSs and using non-orthogonal multiple access (NOMA) (with power domain multiplexing) or Sparse Code Multiple Access (SCMA) (with power and code domains multiplexing). With NOMA and SCMA, an advanced receiver such as e.g. SIC, message passing algorithm (MPA), SIC-MPA, MLD, can be used.

Multiple PDCCHs from different TRPs
- Pros:
  - No information (e.g. feedback, scheduling decision) exchange required between TRPs, suitable for non-ideal backhaul.
  - More flexibility in terms of
    - Different resources of PDSCHs from different TRPs can be used
    - In case of distributed scheduling, there is no extra backhaul delays which affect QoS and/or quality of feedback Embodiment: Distributed NC-JT with Non-Ideal Backhaul with Single MAC The application of multiple DCIs sent from multiple TRPs, convey instructions for multiple PDSHC data streams from multiple TRPs within the same carrier using single Medium Access Control (MAC)

For distributed NC-JT coordinated transmission

UE has single ID, (e.g., RNTI identity)

Common Discontinuous Reception (DRx) cycle from all TRPs

Cooperating TRPs share common frame structure for dynamic duplexing (i.e. UL/DL TDD)

Single HARQ entity
- HARQ processes are partitioned among TRPs and semi-statically coordinated at the network
- Other methods are not precluded. But the network and the UE should have a mutual understanding about re-transmission and associated ACK/NACK message by single HARQ entity
- The use of a single HARQ entity may cause a certain performance degradation due to smaller amount of HARQ processes per TRP The data is split at Packet Data Convergence Protocol (PDCP)

Two independent PDCCH where each PDCCH/DCI includes
- HARQ processes (which are not overlapped from two TRPs)
- DMRS configuration and associated beam/Quasi-Co-Location (QCL) indication
- Physical Resource Block (PRB) allocation
- Modulation and Coding Scheme (MCS)

Two independent PDSCH

Figure 14:
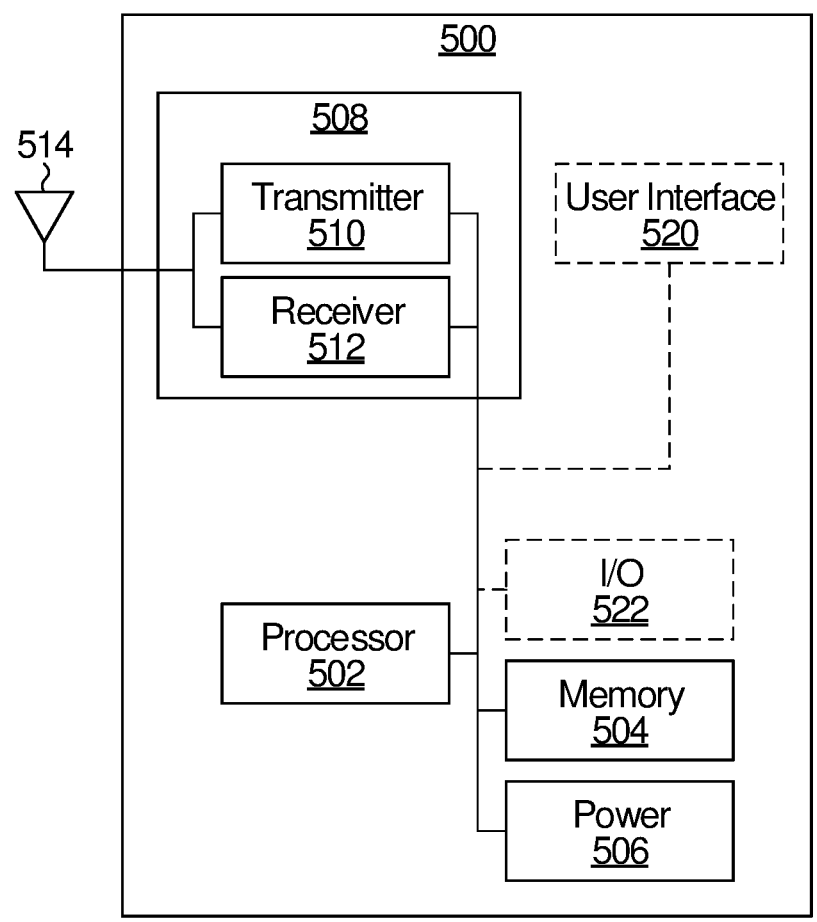
FIG. 14 is a block diagram of a UE according to an embodiment of the present disclosure.

Sources for multiple DCIs from multiple TRPs
- PDCCH search spaces: multiple PDCCH messages (or DCIs) can be in
  - Different search spaces
    - Using the same or different DMRS
    - Resource assignment: different DCIs can convey either fully/partial/non overlapped resource assignment (since no short term coordination is done, the assignment may randomly overlap)
    - HARQ processes are divided between the TRPs in a semi-static manner (longer term cooperation). HARQ processes between TRPs can be independently assigned. There is no coordination required between TRPs. Each TRP is responsible for fulfilling the HARQ transmission of processes associated with that TRP.
  - PDCCH beam: multiple PDCCH messages are in different beam directions
    - UE has multiple RF chains, then different UE rx beam directions has to be done at the same time ACK/NACK channels
- Independent ACK/NACK bits for different CWs from different DCIs.
- The order of ACK/NACK bits corresponding to the order of search spaces, then the order to DCIs (based on the first CCE index), then the order of CWs in the DCI Transmission schemes for control channel: local diversity scheme for each DCI from each TRP Data flow assignment to multiple TRPs: independent data streams from different TRPs FIG. 14 shows one embodiment of a UE 500 for implementing the methods and modules described herein. The UE 500 may include a processor 502, a memory 504, a power source 506 and a wireless communications interface 508 for sending and receiving data in the communications network 100 shown in FIG. 1, which components may or may not be arranged as shown in FIG. 14. The wireless communications interface 508 includes a transmitter 510 and a receiver 512 coupled to an antenna 514. It will be appreciated that the functions of the wireless communications interface 508 may be carried out by different transceiver or modem components including multiple transmitter, receiver, digital signal processor (DSP) and antenna components or arrays. In one embodiment, the UE 500 includes a user interface 520 and various inputs/outputs (I/O) 522 such as a display, audio input, audio output, keypads, buttons, microphones or other inputs or outputs. The memory 504 may store programming and/or instructions for the processor 502 including instructions for sending, receiving, processing and supporting different services and types of data, such as but not limited to video, VoIP calls, web browsing data, email and other text communications.

Although a single antenna 514 is shown in FIG. 14, a UE could include multiple antennas. Separate receive and transmit antennas or sets of multiple antennas could be provided at 514, or the same antenna or set of multiple antennas could be used for both receiving and transmitting communication signals. The antenna 514 could include one or more antennas of any of various types. The type of the antenna, or each antenna, provided at 514 could be implementation-specific.

The transmitter 510 could perform such operations as frequency up-conversion and modulation, and the receiver 512 could perform inverse operations, including frequency down-conversion and demodulation. The transmitter 510 and the receiver 512 could perform other operations instead of or in addition to these example operations, depending on the specific implementation and the types of communication functions and protocols to be supported. The transmitter 510 and the receiver 512 are operative to transmit communication signals to and receive communication signals from one or more network elements a communication network.

Figure 15:
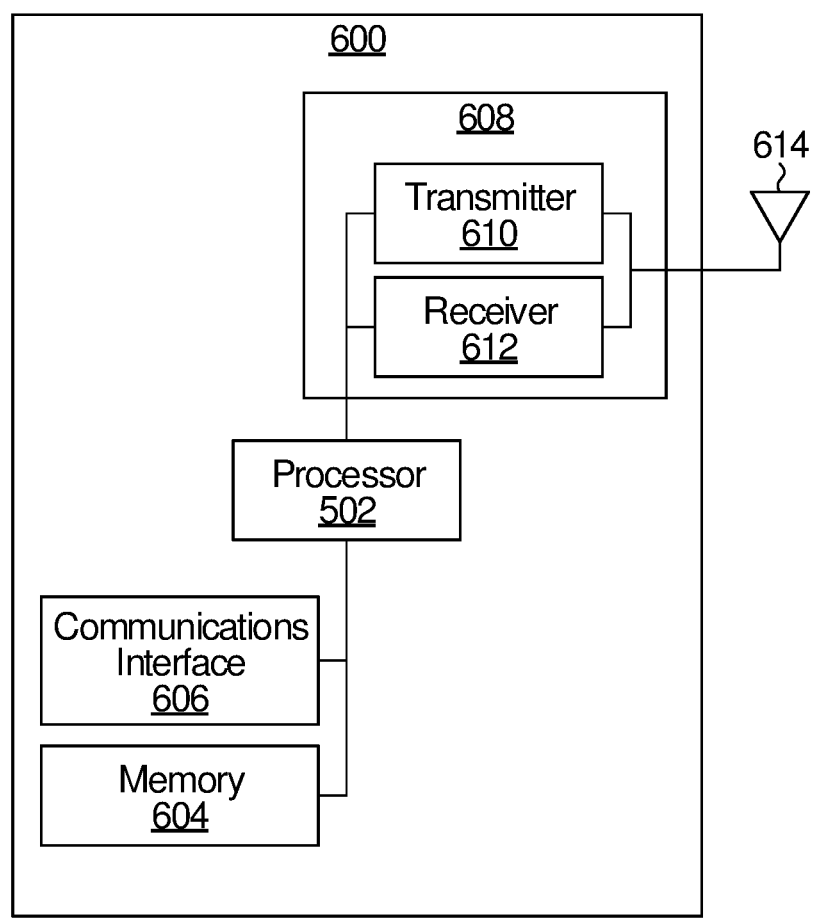
FIG. 15 is a block diagram of a transmission reception point (TRP) in accordance with an embodiment of the present disclosure.

FIG. 15 illustrates a TRP 600 according to an embodiment of the present application. The TRP 600 may comprise a processor 602, a memory 604, one or more communications interfaces 606, 608. The communications interface 606 may be a wired or wireless interface for sending and receiving data to a backhaul network or to other network nodes, gateways or relays in a network, such as the network 100 shown in FIG. 1. The wireless communications interface 608 is configured to send and receive data with one or more UEs, including transmitting PDCCH and PDSCH messages as described herein. It will be appreciated that the functions of the wireless communications interface 608 may be carried out by different transceiver or modem components including multiple transmitter, receiver and antenna components or arrays. The memory 604 may store programming and/or instructions for the processor 602, including instructions for sending and receiving data to and from a UE.

Although a single antenna 614 is shown in FIG. 15, a TRP could include multiple antennas. Separate receive and transmit antennas or sets of multiple antennas could be provided at 614, or the same antenna or set of multiple antennas could be used for both receiving and transmitting communication signals. The antenna 614 could include one or more antennas of any of various types. The type of the antenna, or each antenna, provided at 614 could be implementation-specific.

Figure 16:
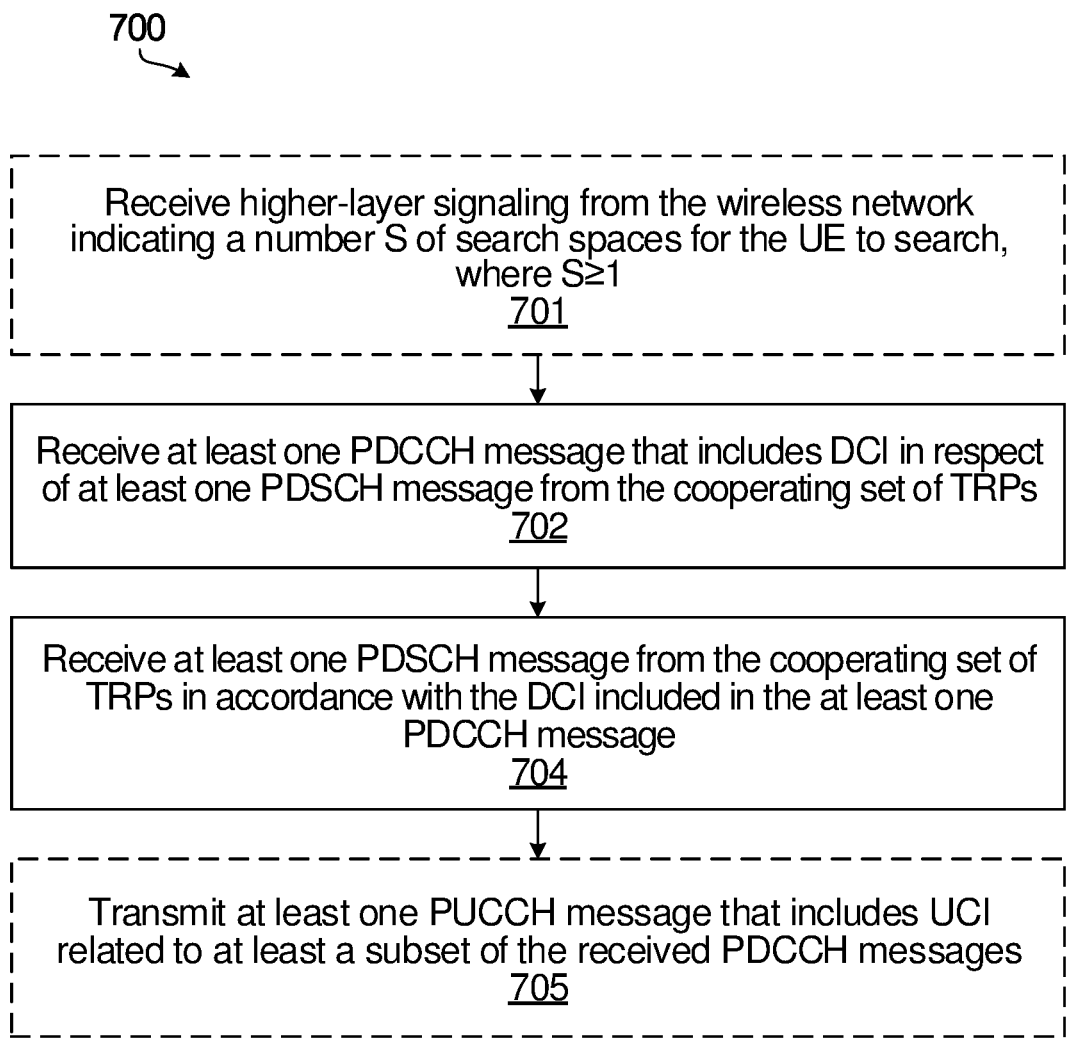
FIG. 16 is a flow diagram of example operations in a UE according to an embodiment of the present disclosure.

FIG. 16 illustrates a flow diagram of example operations 700 in a UE served by a cooperating set of transmission-reception points (TRPs) in a wireless network according to example embodiments described herein.

In block 702, the UE receives at least one PDCCH message that includes DCI in respect of at least one PDSCH message from the cooperating set of TRPs. For example, in one embodiment, the UE receives one PDCCH message that includes DCI in respect of PDSCH messages from multiple TRPs in the cooperating set. In another embodiment, the UE receives multiple PDCCH messages, each PDCCH message including DCI in respect of at least one PDSCH message.

In block 704, the UE, in response to receiving the at least one PDCCH message, receives at least one PDSCH message from the cooperating set of TRPs in accordance with the DCI included in the at least one PDCCH message.

Optionally, the example operations 700 include a block 701 in which the UE receives higher-layer signaling from the wireless network indicating a number S of search spaces for the UE to search, where S≥1. In such embodiments, receiving the at least one PDCCH message in block 702 may include receiving K PDCCH messages, where K≥2, over the S search spaces, and either K≤S and the UE stops searching after K messages have been received, or K>S.

Optionally, the example operations 700 may further include a block 705 in which the UE transmits at least one PUCCH message that includes UCI related to at least a subset of the received PDCCH messages.

Further variations of the example operations 700 could include any or all of the following:
  the PDSCH messages from different TRPs in the cooperating set carry the same transport block (TB) of downlink data;
  the PDSCH messages from different TRPs in the cooperating set carry different TBs of downlink data;
  the multiple PDCCH messages are transmitted from a first TRP in the cooperating set and include DCI in respect of at least one PDSCH message transmitted from a second TRP in the cooperating set;
  the first TRP is an anchor TRP of the cooperating set;
  receiving one PDCCH message comprises receiving the one PDCCH message in a single search space;
  receiving at least one PDCCH message comprises monitoring in N search spaces, where N≥2;
  further comprising receiving, at the UE, higher-layer signaling from the wireless network indicating the number N of search spaces for the UE to monitor;
  receiving multiple PDCCH messages comprises receiving PDCCH messages with different DCI formats;
  receiving multiple PDCCH messages comprises receiving PDCCH messages that share a common DCI format;
  content of the DCI comprises at least one of: Demodulation Reference Signal (DMRS) information for at least one PDSCH message; resource assignment information; and Hybrid Automatic Repeat reQuest (HARQ)/retransmission assignment information;
  the multiple PDCCH messages have different DMRS information;
  the multiple PDCCH messages share common DMRS information;
  the HARQ/retransmission assignment information assigns, in respect of a PDSCH message from a given TRP of the UE's cooperating set, a HARQ process selected from a subset of HARQ processes that have been pre-assigned to the TRP, wherein non-overlapping subsets of HARQ processes are pre-assigned among the TRPs of the UE's cooperating set;
  the HARQ/retransmission assignment information assigns, in respect of a PDSCH message from a given TRP of the UE's cooperating set, a HARQ process that has been dynamically assigned to the TRP;
  receiving multiple PDCCH messages comprises receiving multiple PDCCH messages on one receive (Rx) antenna beam of the UE;
  receiving multiple PDCCH messages comprises receiving multiple PDCCH messages on multiple receive (Rx) antenna beams of the UE;
  the UE comprises multiple RF processing chains, and receiving multiple PDCCH messages on multiple Rx antenna beams comprises monitoring on each Rx antenna beam using a respective RF chain.

The example operations 700 are illustrative of an example embodiment. Various ways to perform the illustrated operations, as well as examples of other operations that may be performed, are described herein. Further variations may be or become apparent.

Figure 17:
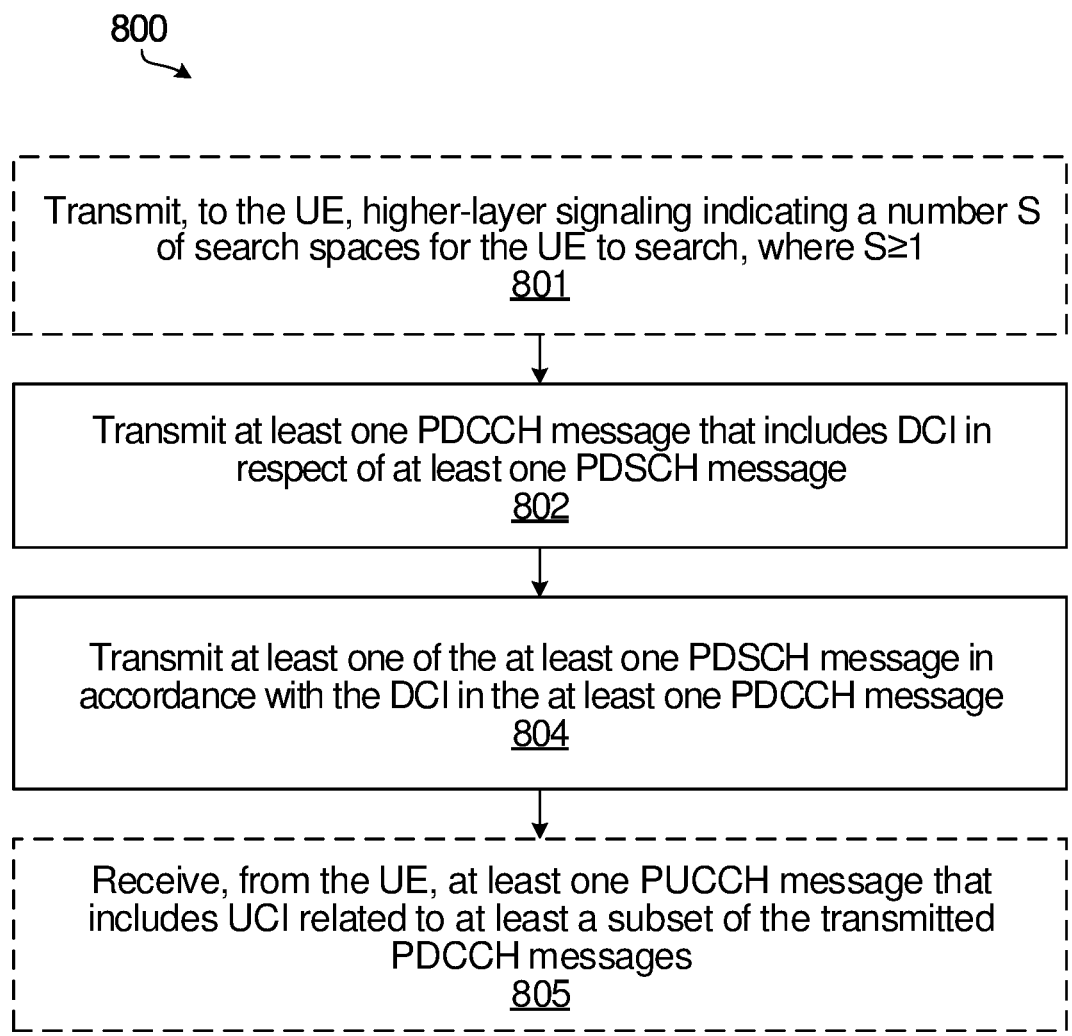
FIG. 17 is a flow diagram of examples operations in a TRP in accordance with an embodiment of the present disclosure.

FIG. 17 illustrates a flow diagram of example operations 800 in a TRP in a cooperating set of TRPs for a User Equipment (UE) in a wireless network according to example embodiments described herein.

In block 802, the TRP transmits, to the UE, at least one PDCCH message that includes DCI in respect of at least one PDSCH message. For example, in some embodiments, the TRP transmits one PDCCH message that includes DCI in respect of PDSCH messages from multiple TRPs in the cooperating set. In other embodiments, the TRP transmits multiple PDCCH messages, each PDCCH message including DCI in respect of at least one PDSCH message.

In block 804, the TRP transmits, to the UE, at least one of the at least one PDSCH message in accordance with the DCI in the at least one PDCCH message.

Optionally, the example operations 800 include a block 801 in which the TRP transmits, to the UE, higher-layer signaling indicating a number S of search spaces for the UE to search, where S≥1. In such embodiments, transmitting the at least one PDCCH message in block 802 may include transmitting the at least one PDCCH message comprises transmitting K PDCCH messages, where K≥2, over the S search spaces, and either K≤S and the UE stops searching after K messages have been received, or K>S.

Optionally, the example operations 800 may further include a block 805 in which the TRP receives, form the UE, at least one PUCCH message that includes UCI related to at least a subset of the transmitted PDCCH messages.

Further variations of the example operations 800 could include any or all of the following:

the PDSCH messages from different TRPs in the cooperating set carry the same transport block (TB) of downlink data;

the PDSCH messages from different TRPs in the cooperating set carry different TBs of downlink data;

the multiple PDCCH messages include DCI in respect of at least one PDSCH message transmitted from another TRP in the cooperating set;

the TRP is an anchor TRP of the cooperating set and the other TRP is a non-anchor TRP of the cooperating set;

transmitting one PDCCH message comprises transmitting the one PDCCH message in a single search space;

transmitting multiple PDCCH messages comprises transmitting the PDCCH messages among N search spaces, where N≥1;

content of the DCI comprises at least one of: Demodulation Reference Signal (DMRS) information for at least one PDSCH message; resource assignment information; and Hybrid Automatic Repeat reQuest (HARQ)/retransmission assignment information;

the HARQ/retransmission assignment information assigns, in respect of a PDSCH message from a given TRP of the cooperating set, a HARQ process selected from a subset of HARQ processes that have been pre-assigned to the given TRP, wherein non-overlapping subsets of HARQ processes are pre-assigned among the TRPs of the UE's cooperating set;

the HARQ/retransmission assignment information assigns, in respect of a PDSCH message from a given TRP of the cooperating set, a HARQ process that has been dynamically assigned to the given TRP;

transmitting, to the UE, at least one PDCCH message comprises transmitting multiple PDCCH messages on one transmit (Tx) antenna beam of the TRP;

further comprising receiving, from at least one other TRP of the cooperating set, the other TRP's scheduling decision for transmission of a PDSCH message to the UE, wherein transmitting, to the UE, at least one PDCCH message comprises transmitting a PDCCH message that includes DCI in respect of the PDSCH message the other TRP has scheduled for the UE;

further comprising receiving, from a central controller in the wireless network, a scheduling decision for transmission of a PDSCH message to the UE, wherein transmitting, to the UE, at least one PDCCH message comprises transmitting a PDCCH message that includes DCI in respect of the PDSCH message that has been scheduled by the central controller.

The example operations 800 are illustrative of an example embodiment. Various ways to perform the illustrated operations, as well as examples of other operations that may be performed, are described herein. Further variations may be or become apparent.

In fifth generation (5G) or New Radio (NR) wireless networks, UEs may be configured to monitor NR-PDCCH on multiple beam pair links for robustness against beam pair link blocking. The feasibility and benefits of supporting different NR-PDSCH data streams from multiple TRPs with both ideal and non-ideal backhaul in NR have been demonstrated. However, it is also understood that with non-ideal backhaul (NIB) links, performance loss is inevitable due to CSI ageing resulting in poor link adaptation and delay from scheduling decision/data exchanges resulting in challenges to satisfy the QoS delay requirement in certain cases. In these cases, independent scheduling at each TRP of the cooperating TRPs without sharing those information, is attractive or maybe the only viable option.

Embodiments of the present disclosure enable independent scheduling of NR-PDCCH messages at cooperating TRPs within the same carrier by sending control information corresponding to a PDSCH from each TRP independently. This requires the reception of multiple NR-PDCCH corresponding to multiple PDSCH at a UE.

The number of blind detections that a UE must perform scales linearly with the number of NR-PDCCH. One way to reduce the number of blind detections is to signal the maximal number of multiple NR-PDCCH to a UE by L3/L2 signaling. The blind detection can be terminated when such number of NR-PDCCH is achieved. Furthermore, a subset of aggregation levels can be configured per NR-PDCCH for a UE.

With respect to feasibility of multiple NR-PDCCHs demodulation from multiple TRPs, DMRS-based demodulation can provide beamforming gain. For example, to reduce the interference of multiple NR-PDCCHs to each other, the NR-PDCCH for one TRP may not be transmitted at the resource of NR-PDCCH transmitted from the other TRPs. Moreover, TRPs can apply DL power control and ICIC-type techniques to improve the quality of multiple NR-PDCCH demodulation. That is each TRP increases the power in the UE NR-PDCCH resource from itself, and reduces the power in resources for the neighboring TRPs. These require only long-term coordination between TRPs. Furthermore, in some embodiments higher aggregation levels can be used to demodulate multiple NR-PDCCH from multiple TRPs. Moreover, this reduces UE complexity because only a subset of aggregation levels is considered. A combination of the above techniques can also be used.

In some embodiments, a unified DCI size/format is used. With multiple NR-PDCCH, unified DCI formats with the same payload sizes could be easily achieved for both single and multiple TPRs/panels transmission since each of the multiple NR-PDCCH conveys control information for a single TRP.

In some embodiments, uplink power control is used for concurrent UCI transmission. For example, for power-limited cell-edge UEs, it is possible to transmit multiple UCIs in TDM fashion at symbol-level.

In some embodiments, long-term coordination between TRPs is used to avoid simultaneous DL and UL transmissions for a UE in TDD.

With respect to CSI processing, in some embodiments TRPs can have a long-term coordination or define dropping rules of CSI processing by specification on aperiodic CSI requests to avoid requiring a UE to have to process the requests at the same time.

Some embodiments of the present disclosure provide the following specification for the reception of multiple NR-PDCCH within the same carrier:

the reception of multiple NR-PDCCH on K≥1 beam pair links simultaneously or different beam pair link(s) in different NR-PDCCH OFDM symbols;

signaling the maximum number of multiple NR-PDCCH reception via L3/L2 signaling;

DCI formats with corresponding payload sizes for each of multiple NR-PDCCH can be the same as those designed for single TRP MIMO transmission.

The following provides a non-limiting list of example embodiments of the present disclosure:

Example Embodiment 1. A method for a User Equipment (UE) in a wireless network, the method comprising:

receiving, at the UE, at least one Physical Downlink Control Channel (PDCCH) message that includes Downlink Control Information (DCI) in respect of at least one Physical Downlink Shared Channel (PDSCH) message; and in response to receiving the at least one PDCCH message, receiving at least one PDSCH message in accordance with the DCI included in the at least one PDCCH message, wherein receiving at least one PDCCH message comprises:

i) receiving one PDCCH message that includes DCI in respect of at least one PDSCH message from multiple transmission-reception points (TRPs); or ii) receiving multiple PDCCH messages, each PDCCH message including DCI in respect of at least one PDSCH message.

Example Embodiment 2. The method of Example Embodiment 1, wherein the PDSCH messages from different TRPs carry the same transport block (TB) of downlink data, or wherein the PDSCH messages from different TRPs carry different TBs of downlink data.

Example Embodiment 3. The method of any one of Example Embodiments 1 to 2, further comprising receiving, at the UE, higher-layer signaling from the wireless network indicating a number S of search spaces for the UE to search, where S≥1, wherein receiving the at least one PDCCH message comprises receiving K PDCCH messages, where K≥2, over the S search spaces, and wherein either K≤S and the UE stops searching after K messages have been received, or K>S.

Example Embodiment 4. The method of Example Embodiment 3, wherein at least two of the K PDCCH messages are located in the same search space, located in multiple overlapping search spaces, or located in different search spaces.

Example Embodiment 5. The method of any one of Example Embodiments 3 or 4, wherein the at least two PDCCH messages are distinguished by different demodulation reference signals (DMRSs).

Example Embodiment 6. The method of any one of Example Embodiments 1 to 5, further comprising:

transmitting, at least one physical uplink control channel (PUCCH) message that includes Uplink Control Information (UCI) related to at least a subset of the received PDCCH messages.

Example Embodiment 7. The method of Example Embodiment 6, wherein there is a one-to-one mapping between UCI and PDCCH or there is a many-to-one mapping between PDCCH and UCI.

Example Embodiment 8. The method of any one of Example Embodiments 1 to 7, wherein the PDSCH messages from different TRPs in the cooperating set carry different TBs of downlink data.

Example Embodiment 9. The method of any one of Example Embodiments 1 to 8, wherein the multiple PDCCH messages are transmitted from a first TRP in the cooperating set and include DCI in respect of at least one PDSCH message transmitted from a second TRP in the cooperating set.

Example Embodiment 10. The method of Example Embodiment 9, wherein the first TRP is an anchor TRP of the cooperating set.

Example Embodiment 11. The method of any one of Example Embodiments 1 to 10, wherein receiving one PDCCH message comprises receiving the one PDCCH message in at least one search space.

Example Embodiment 12. The method of Example Embodiment 3, further comprising receiving, at the UE, higher-layer signaling from the wireless network indicating the number S of search spaces for the UE to search.

Example Embodiment 13. The method of Example Embodiment 3 or 4, wherein K>S.

Example Embodiment 14. The method of Example Embodiment 3 or 4, wherein K≤S, and the UE stops searching after K messages have been received.

Example Embodiment 15. The method of any one of Example Embodiments 3 to 14, wherein at least two of the K PDCCH message are located in different search spaces.

Example Embodiment 16. The method of Example Embodiment 15, wherein at least a subset of the different search spaces are in the same control resource set.

Example Embodiment 17. The method of Example Embodiment 16, wherein the UE uses different configured IDs to determine resources and/or patterns for different search spaces associated with the same or different PDCCH message.

Example Embodiment 18. The method of Example Embodiment 16, wherein the UE uses configured hierarchies between search spaces associated to given beams and/or TRPs to identify different search spaces.

Example Embodiment 19. The method of Example Embodiment 15, wherein at least a subset of the different search spaces are in different control resource sets.

Example Embodiment 20. The method of any one of Example Embodiments 1 to 19, further comprising:

the UE transmitting signaling to inform the network of the maximum number of PDCCH messages the UE can monitor and/or receive.

Example Embodiment 21. The method of any one of Example Embodiments 1 to 20, wherein receiving at least one PDCCH message comprises performing blind detection on PDCCH candidates with configured aggregation levels over assigned search spaces.

Example Embodiment 22. The method of Example Embodiment 21, wherein for at least one PDCCH message corresponding to one TRP, the configured aggregation levels for the search space associated with the PDCCH message corresponding to the TRP includes less than the total number of aggregation level possible in the network.

Example Embodiment 23. The method of Example Embodiment 21 or 22, wherein the configured aggregation levels for different search spaces associated with different PDCCH messages corresponding to different TRPs are different for at least of the PDCCH messages.

Example Embodiment 24. The method of any one of Example Embodiments 3, 4, 5 or 12 to 19, wherein receiving K PDCCH messages over S search spaces comprises receiving the K PDCCH messages over the S search spaces in P different beam pair links (BPLs), where P≥1.

Example Embodiment 25. The method of Example Embodiment 24, wherein P≥2.

Example Embodiment 26. The method of Example Embodiment 25, wherein the same search space is repeated in at least two BPLs.

Example Embodiment 27. The method of Example Embodiment 25 or 26, wherein BPLs are monitored in a Time Division Multiplexed (TDM-ed) manner.

Example Embodiment 28. The method of Example Embodiment 6, wherein transmitting at least one PUCCH comprises transmitting, for each received PDCCH message, a respective PUCCH message to the TRP.

Example Embodiment 29. The method of Example Embodiment 7, wherein the UE is power limited and transmitting the at least one PUCCH message comprises transmitting multiple PUCCH messages using symbol-level time division multiplexing, beam-based time division multiplexing or a proportional assignment of available power between different PUCCH messages.

Example Embodiment 30. The method of Example Embodiment 7, wherein the UE is non-power limited and transmitting the at least one PUCCH message comprises transmitting multiple PUCCH messages using frequency division multiplexing or code division multiplexing.

Example Embodiment 31. The method of Example Embodiment 6, wherein there is a many-to-one mapping between PDCCH and UCI.

Example Embodiment 32. The method of Example Embodiment 31, wherein transmitting at least one PUCCH message comprises combining multiple UCI into a combined PUCCH message and transmitting the combined PUCCH message to a TRP acting as an uplink control anchor node for the cooperating set of TRPs.

Example Embodiment 33. The method of any one of Example Embodiments 1 to 32, wherein receiving multiple PDCCH messages comprises receiving PDCCH messages with different DCI formats.

Example Embodiment 34. The method of any one of Example Embodiments 1 to 32, wherein receiving multiple PDCCH messages comprises receiving PDCCH messages that share a common DCI format.

Example Embodiment 35. The method of any one of Example Embodiments 1 to 34, wherein content of the DCI comprises at least one of: Demodulation Reference Signal (DMRS) information for at least one PDSCH message; resource assignment information; and Hybrid Automatic Repeat reQuest (HARQ)/retransmission assignment information.

Example Embodiment 36. The method of Example Embodiment 35, wherein the multiple PDCCH messages have different DMRS information.

Example Embodiment 37. The method of Example Embodiment 35, wherein the multiple PDCCH messages share common DMRS information.

Example Embodiment 38. The method of any one of Example Embodiments 35 to 37, wherein the HARQ/retransmission assignment information assigns, in respect of a PDSCH message from a given TRP of the UE's cooperating set, a HARQ process selected from a subset of HARQ processes that have been pre-assigned to the TRP, wherein non-overlapping subsets of HARQ processes are pre-assigned among the TRPs of the UE's cooperating set.

Example Embodiment 39. The method of any one of Example Embodiments 35 to 37, wherein the HARQ/retransmission assignment information assigns, in respect of a PDSCH message from a given TRP of the UE's cooperating set, a HARQ process that has been dynamically assigned to the TRP.

Example Embodiment 40. The method of any one of Example Embodiments 1 to 39, wherein receiving multiple PDCCH messages comprises receiving multiple PDCCH messages on one receive (Rx) antenna beam of the UE.

Example Embodiment 41. The method of any one of Example Embodiments 1 to 39, wherein receiving multiple PDCCH messages comprises receiving multiple PDCCH messages on multiple receive (Rx) antenna beams of the UE.

Example Embodiment 42. The method of Example Embodiment 41, wherein the UE comprises multiple RF processing chains, and receiving multiple PDCCH messages on multiple Rx antenna beams comprises receiving on each Rx antenna beam using a respective RF chain.

Example Embodiment 43. The method of Example Embodiment 1, wherein the one PDCCH message includes DCI in respect of a single PDSCH message from multiple TRPs in the cooperating set.

Example Embodiment 44. The method of Example Embodiment 43, wherein the single PDSCH message includes at least one codeword, each codeword including at least one data layer.

Example Embodiment 45. The method of any one of Example Embodiments 1 to 18, wherein receiving at least one PDCCH message comprises performing blind detection on a configured subset of PDCCH message candidates over at least one assigned search space.

Example Embodiment 46. The method of Example Embodiment 45, wherein the configured subset of PDCCH message candidates is UE-specific.

Example Embodiment 47. A method for a transmission-reception point (TRP) in a wireless network, the method comprising:
 transmitting, to a User Equipment (UE), at least one Physical Downlink Control Channel (PDCCH) message that includes Downlink Control Information (DCI) in respect of at least one Physical Downlink Shared Channel (PDSCH) message; and
 transmitting, to the UE, at least one of the at least one PDSCH message in accordance with the DCI in the at least one PDCCH message,
 wherein transmitting the at least one PDCCH message comprises:
 i) transmitting one PDCCH message that includes DCI in respect of at least one PDSCH message from multiple TRPs in a cooperating set of TRPs serving the UE; or
 ii) transmitting multiple PDCCH messages, each PDCCH message including DCI in respect of at least one PDSCH message.

Example Embodiment 48. The method of Example Embodiment 47, further comprising transmitting, to the UE, higher-layer signaling indicating a number S of search spaces for the UE to search, where S≥1, wherein transmitting the at least one PDCCH message comprises transmitting K PDCCH messages, where K≥2, over the S search spaces, and wherein either K≤S and the UE stops searching after K messages have been received, or K>S.

Example Embodiment 49. The method of any one of Example Embodiments 47 or 48, further comprising receiving, from the UE, at least one physical uplink control channel (PUCCH) message that includes Uplink Control Information (UCI) related to at least a subset of the transmitted PDCCH messages.

Example Embodiment 50. The method of Example Embodiment 47, wherein the PDSCH messages from different TRPs in the cooperating set carry the same transport block (TB) of downlink data.

Example Embodiment 51. The method of Example Embodiment 47, wherein the PDSCH messages from different TRPs in the cooperating set carry different TBs of downlink data.

Example Embodiment 52. The method of any one of Example Embodiments 47 to 50 wherein the multiple PDCCH messages include DCI in respect of at least one PDSCH message transmitted from another TRP in the cooperating set.

Example Embodiment 53. The method of Example Embodiment 52, wherein the TRP is an anchor TRP of the cooperating set and the other TRP is a non-anchor TRP of the cooperating set.

Example Embodiment 54. The method of any one of Example Embodiments 47 to 53, wherein transmitting one PDCCH message comprises transmitting the one PDCCH message in at least one search space.

Example Embodiment 55. The method of any one of Example Embodiments 47 to 54, wherein transmitting multiple PDCCH messages comprises transmitting the PDCCH messages among N search spaces, where N≥1.

Example Embodiment 56. The method of any one of Example Embodiments 47 to 55, wherein content of the DCI comprises at least one of: Demodulation Reference Signal (DMRS) information for at least one PDSCH message; resource assignment information; and Hybrid Automatic Repeat reQuest (HARQ)/retransmission assignment information.

Example Embodiment 57. The method of Example Embodiment 56, wherein the HARQ/retransmission assignment information assigns, in respect of a PDSCH message from a given TRP of the cooperating set, a HARQ process selected from a subset of HARQ processes that have been pre-assigned to the given TRP, wherein non-overlapping subsets of HARQ processes are pre-assigned among the TRPs of the UE's cooperating set.

Example Embodiment 58. The method of Example Embodiment 56, wherein the HARQ/retransmission assignment information assigns, in respect of a PDSCH message from a given TRP of the cooperating set, a HARQ process that has been dynamically assigned to the given TRP.

Example Embodiment 59. The method of any one of Example Embodiments 47 to 58, wherein transmitting, to the UE, at least one PDCCH message comprises transmitting multiple PDCCH messages on one transmit (Tx) antenna beam of the TRP.

Example Embodiment 60. The method of any one of Example Embodiments 47 to 59, further comprising:
receiving, from at least one other TRP of the cooperating set, the other TRP's scheduling decision for transmission of a PDSCH message to the UE, wherein transmitting, to the UE, at least one PDCCH message comprises transmitting a PDCCH message that includes DCI in respect of the PDSCH message the other TRP has scheduled for the UE.

Example Embodiment 61. The method of any one of Example Embodiments 47 to 59, further comprising:
receiving, from a central controller in the wireless network, a scheduling decision for transmission of a PDSCH message to the UE, wherein transmitting, to the UE, at least one PDCCH message comprises transmitting a PDCCH message that includes DCI in respect of the PDSCH message that has been scheduled by the central controller.

Example Embodiment 62. The method of any one of Example Embodiments 47 to 59, further comprising:
receiving, from a central controller in the wireless network or another TRP in the cooperating set, a UE-specific aperiodic channel state information (CSI) request pattern; and
transmitting CSI requests aperiodically to the UE in accordance with the UE-specific aperiodic CSI request pattern.

Example Embodiment 63. The method of any one of Example Embodiments 47 to 59, further comprising:
receiving, from a central controller in the wireless network or another TRP in the cooperating set, a UE-specific UL/DL TTI-based pattern; and
communicating with the UE in accordance with the UE-specific UL/DL TTI-based pattern.

Example Embodiment 64. The method of any one of Example Embodiments 47 to 63, further comprising co-ordinating with other cooperating TRPs to maintain non-overlapped search spaces for the UE.

Example Embodiment 65. The method of Example Embodiment 64, further comprising performing downlink power control in search spaces used by other cooperating TRPs.

Example Embodiment 66. The method of any one of Example Embodiments 47 to 65, wherein the TRP shares a common frame structure with other TRPs in the cooperating set.

Example Embodiment 67. The method of any one of Example Embodiments 47 to 66, further comprising transmitting signaling to the UE, the signaling including information indicating at least one of the following:
a control resource set;
control search spaces;
a relation of control resource sets and search spaces;
a maximum number K of PDCCH messages that the UE can expect to receive;
a UE-specific subset of aggregation levels per PDCCH or each of multiple PDCCH messages.

Example Embodiment 68. The method of Example Embodiment 67, wherein K<=Pu, where Pu is the maximum number of PDCCH messages the UE is capable of receiving.

Example Embodiment 69. The method of Example Embodiment 47, wherein the one PDCCH message includes DCI in respect of a single PDSCH message from multiple TRPs in the cooperating set.

Example Embodiment 70. The method of Example Embodiment 69, wherein the single PDSCH message includes at least one codeword, each codeword including at least one data layer.

Example Embodiment 71. The method of any one of Example Embodiments 47 to 70, further comprising transmitting, to the UE, signaling to inform the UE of a configured subset of PDCCH message candidates for blind detection over at least one assigned search space.

Example Embodiment 72. The method of Example Embodiment 71, wherein the configured subset of PDCCH message candidates is UE-specific.

Example Embodiment 73. A User Equipment (UE) comprising:
a memory storage comprising instructions; and
one or more processors in communication with the memory, wherein the one or more processors execute the instructions to:

receive at least one Physical Downlink Control Channel (PDCCH) message that includes Downlink Control Information (DCI) in respect of at least one Physical Downlink Shared Channel (PDSCH) message;

in response to receiving the at least one PDCCH message, receive at least one PDSCH message from in accordance with the DCI included in the at least one PDCCH message; and wherein the one or more processors execute the instructions to receive at least one PDCCH message through receiving one PDCCH message that includes DCI in respect of at least one PDSCH message from multiple TRPs, or receiving multiple PDCCH messages, each PDCCH message including DCI in respect of at least one PDSCH message.

Example Embodiment 74. The UE of Example Embodiment 73, wherein the PDSCH messages from different TRPs carry the same transport block (TB) of downlink data, or wherein the PDSCH messages from different TRPs carry different TBs of downlink data.

Example Embodiment 75. The UE of any one of Example Embodiments 73 to 74, wherein the one or more processors further execute the instructions to receive, at the UE, higher-layer signaling from the wireless network indicating a number S of search spaces for the UE to search, where S≥1, wherein receiving the at least one PDCCH message comprises receiving K PDCCH messages, where K≥2, over the S search spaces, and wherein either K≤S and the UE stops searching after K messages have been received, or K>S.

Example Embodiment 76. The UE of Example Embodiment 75, wherein at least two of the K PDCCH messages are located in the same search space, located in multiple overlapping search spaces, or located in different search spaces.

Example Embodiment 77. The UE of any one of Example Embodiments 75 or 76, wherein the at least two PDCCH messages are distinguished by different demodulation reference signals (DMRSs).

Example Embodiment 78. The UE of any one of Example Embodiments 73 to 77, wherein the one or more processors further execute the instructions to transmit at least one physical uplink control channel (PUCCH) message that includes Uplink Control Information (UCI) related to at least a subset of the received PDCCH messages.

Example Embodiment 79. The UE of Example Embodiment 78, wherein there is a one-to-one mapping between UCI and PDCCH or there is a many-to-one mapping between PDCCH and UCI.

Example Embodiment 80. The UE of Example Embodiment 73, wherein the PDSCH messages from different TRPs carry different TBs of downlink data.

Example Embodiment 81. The UE of any one of Example Embodiments 73 to 80, wherein the multiple PDCCH messages are transmitted from a first TRP and include DCI in respect of at least one PDSCH message transmitted from a second TRP.

Example Embodiment 82. The UE of Example Embodiment 81, wherein the first TRP is an anchor TRP of a cooperating set of TRPs serving the UE.

Example Embodiment 83. The UE of any one of Example Embodiments 73 to 782 wherein receiving one PDCCH message comprises receiving the one PDCCH message in at least one search space.

Example Embodiment 84. The UE of Example Embodiment 75, wherein the one or more processors further execute the instructions to receive, at the UE, higher-layer signaling from the wireless network indicating the number S of search spaces for the UE to search.

Example Embodiment 85. The UE of Example Embodiment 75 or 84, wherein K>S.

Example Embodiment 86. The UE of Example Embodiment 75 or 84, wherein K≤S, and the UE stops searching after K messages have been received.

Example Embodiment 87. The UE of any one of Example Embodiments 75 to 77 or 84 to 86, wherein at least two of the K PDCCH message are located in different search spaces.

Example Embodiment 88. The UE of Example Embodiment 87, wherein the different search spaces are in the same control resource set.

Example Embodiment 89. The UE of Example Embodiment 88, wherein the UE uses different configured IDs to determine resources and/or patterns for different search spaces associated with the same or different PDCCH message.

Example Embodiment 90. The UE of Example Embodiment 88, wherein the UE uses configured hierarchies between search spaces associated to given beams and/or TRPs to identify different search spaces.

Example Embodiment 91. The UE of Example Embodiment 87, wherein the different search spaces are in different control resource sets.

Example Embodiment 92. The UE of any one of Example Embodiments 73 to 91, wherein the one or more processors further execute the instructions to transmit signaling to inform the network of the maximum number of PDCCH messages the UE can monitor and/or receive.

Example Embodiment 93. The UE of any one of Example Embodiments 73 to 92, wherein receiving at least one PDCCH message comprises performing blind detection on PDCCH candidates with configured aggregation levels over assigned search spaces.

Example Embodiment 94. The UE of Example Embodiment 93, wherein for at least one PDCCH message corresponding to one TRP, the configured aggregation levels for the search space associated with the PDCCH message corresponding to the TRP includes less than the total number of aggregation level possible in the network.

Example Embodiment 95. The UE of Example Embodiment 93 or 94, wherein the configured aggregation levels for different search spaces associated with different PDCCH messages corresponding to different TRPs are different for at least some of the PDCCH messages.

Example Embodiment 96. The UE of any one of Example Embodiments 75 to 77 or 84 to 91, wherein receiving K PDCCH messages over S search spaces comprises receiving the K PDCCH messages over the S search spaces in P different beam pair links (BPLs), where P≥1.

Example Embodiment 97. The UE of Example Embodiment 96, wherein P≥2.

Example Embodiment 98. The UE of Example Embodiment 97, wherein receiving the K PDCCH messages over the S search spaces in P different beam pair links comprises receiving at least one of the PDCCH messages over the same search space in at least two BPLs.

Example Embodiment 99. The UE of Example Embodiment 97 or 98, wherein BPLs are monitored in a Time Division Multiplexed (TDM-ed) manner.

Example Embodiment 100. The UE of Example Embodiment 78, wherein transmitting at least one PUCCH comprises transmitting, for each received PDCCH message, a respective PUCCH message.

Example Embodiment 101. The UE of Example Embodiment 79, wherein the UE is power limited and transmitting the at least one PUCCH message comprises transmitting multiple PUCCH messages using symbol-level time division multiplexing, beam-based time division multiplexing or a proportional assignment of available power between different PUCCH messages.

Example Embodiment 102. The UE of Example Embodiment 79, wherein the UE is non-power limited and transmitting the at least one PUCCH message comprises transmitting multiple PUCCH messages using frequency division multiplexing or code division multiplexing.

Example Embodiment 103. The UE of Example Embodiment 78, wherein there is a many-to-one mapping between PDCCH and UCI.

Example Embodiment 104. The UE of Example Embodiment 103, wherein transmitting at least one PUCCH message comprises combining multiple UCI into a combined PUCCH message and transmitting the combined PUCCH message to a TRP acting as an uplink control anchor node.

Example Embodiment 105. The UE of any one of Example Embodiments 73 to 104, wherein receiving multiple PDCCH messages comprises receiving PDCCH messages with different DCI formats.

Example Embodiment 106. The UE of any one of Example Embodiments 73 to 104, wherein receiving multiple PDCCH messages comprises receiving PDCCH messages that share a common DCI format.

Example Embodiment 107. The UE of any one of Example Embodiments 73 to 106, wherein content of the DCI comprises at least one of: Demodulation Reference Signal (DMRS) information for at least one PDSCH message; resource assignment information; and Hybrid Automatic Repeat reQuest (HARQ)/retransmission assignment information.

Example Embodiment 108. The UE of Example Embodiment 107, wherein the multiple PDCCH messages have different DMRS information.

Example Embodiment 109. The UE of Example Embodiment 107, wherein the multiple PDCCH messages share common DMRS information.

Example Embodiment 110. The UE of any one of Example Embodiments 107 to 109, wherein the HARQ/retransmission assignment information assigns, in respect of a PDSCH message from a given TRP, a HARQ process selected from a set of HARQ processes that have been pre-assigned to the TRP, wherein non-overlapping sets of HARQ processes are pre-assigned among TRPs serving the UE.

Example Embodiment 111. The UE of any one of Example Embodiments 107 to 109, wherein the HARQ/retransmission assignment information assigns, in respect of a PDSCH message from a given TRP, a HARQ process that has been dynamically assigned to the TRP.

Example Embodiment 112. The UE of any one of Example Embodiments 73 to 111, wherein receiving multiple PDCCH messages comprises receiving multiple PDCCH messages on one receive (Rx) antenna beam of the UE.

Example Embodiment 113. The UE of any one of Example Embodiments 73 to 111, wherein receiving multiple PDCCH messages comprises receiving multiple PDCCH messages on multiple receive (Rx) antenna beams of the UE.

Example Embodiment 114. The UE of Example Embodiment 113, wherein the UE comprises multiple RF processing chains, and receiving multiple PDCCH messages on multiple Rx antenna beams comprises receiving on each Rx antenna beam using a respective RF chain.

Example Embodiment 115. The UE of Example Embodiment 73, wherein the one PDCCH message includes DCI in respect of a single PDSCH message from multiple TRPs.

Example Embodiment 116. The UE of Example Embodiment 115, wherein the single PDSCH message includes at least one codeword, each codeword including at least one data layer.

Example Embodiment 117. The UE of any one of Example Embodiments 73 to 92, wherein receiving at least one PDCCH message comprises performing blind detection on a configured set of PDCCH candidates over at least one assigned search space, the configured set of PDCCH candidates including less than the total number of PDCCH candidates possible in the network.

Example Embodiment 118. The UE of Example Embodiment 117, wherein the configured set of PDCCH candidates is UE-specific.

Example Embodiment 119. A transmission-reception point (TRP) comprising:
 a memory storage comprising instructions; and
 one or more processors in communication with the memory, wherein the one or more processors execute the instructions to:
 transmit, to the UE, at least one Physical Downlink Control Channel (PDCCH) message that includes Downlink Control Information (DCI) in respect of at least one Physical Downlink Shared Channel (PDSCH) message; and|
 transmit, to the UE, at least one of the at least one PDSCH message in accordance with the DCI in the at least one PDCCH message,
 wherein the one or more processors execute the instructions to transmit the at least one PDCCH message through transmitting one PDCCH message that includes DCI in respect of at least one PDSCH message from multiple TRPs in a cooperating set of TRPs serving the UE, or transmitting multiple PDCCH messages, each PDCCH message including DCI in respect of at least one PDSCH message.

Example Embodiment 120. The TRP of Example Embodiment 119, wherein the one or more processors further execute the instructions to transmit, to the UE, higher-layer signaling indicating a number S of search spaces for the UE to search, where S≥1, wherein transmitting the at least one PDCCH message comprises transmitting K PDCCH messages, where K≥2, over the S search spaces, and wherein either K≤S and the UE stops searching after K messages have been received, or K>S.

Example Embodiment 121. The TRP of any one of Example Embodiments 119 or 120, wherein the one or more processors further execute the instructions to receive, from the UE, at least one physical uplink control channel (PUCCH) message that includes Uplink Control Information (UCI) related to at least a subset of the transmitted PDCCH messages.

Example Embodiment 122. The TRP of Example Embodiment 119, wherein the PDSCH messages from different TRPs in the cooperating set carry the same transport block (TB) of downlink data.

Example Embodiment 123. The TRP of Example Embodiment 119, wherein the PDSCH messages from different TRPs in the cooperating set carry different TBs of downlink data.

Example Embodiment 124. The TRP of any one of Example Embodiments 119 to 123 wherein the multiple PDCCH messages include DCI in respect of at least one PDSCH message transmitted from another TRP in the cooperating set.

Example Embodiment 125. The TRP of Example Embodiment 124, wherein the TRP is an anchor TRP of the cooperating set and the other TRP is a non-anchor TRP of the cooperating set.

Example Embodiment 126. The TRP of any one of Example Embodiments 119 to 125, wherein transmitting one PDCCH message comprises transmitting the one PDCCH message in at least one search space.

Example Embodiment 127. The TRP of any one of Example Embodiments 119 to 126, wherein transmitting multiple PDCCH messages comprises transmitting the PDCCH messages among N search spaces, where N≥1.

Example Embodiment 128. The TRP of any one of Example Embodiments 119 to 127, wherein content of the DCI comprises at least one of: Demodulation Reference Signal (DMRS) information for at least one PDSCH message; resource assignment information; and Hybrid Automatic Repeat reQuest (HARQ)/retransmission assignment information.

Example Embodiment 129. The TRP of Example Embodiment 128, wherein the HARQ/retransmission assignment information assigns, in respect of a PDSCH message from a given TRP of the cooperating set, a HARQ process selected from a set of HARQ processes that have been pre-assigned to the given TRP, wherein non-overlapping sets of HARQ processes are pre-assigned among the TRPs of the UE's cooperating set.

Example Embodiment 130. The TRP of Example Embodiment 128, wherein the HARQ/retransmission assignment information assigns, in respect of a PDSCH message from a given TRP of the cooperating set, a HARQ process that has been dynamically assigned to the given TRP.

Example Embodiment 131. The TRP of any one of Example Embodiments 119 to 130, wherein transmitting, to the UE, at least one PDCCH message comprises transmitting multiple PDCCH messages on one transmit (Tx) antenna beam of the TRP.

Example Embodiment 132. The TRP of any one of Example Embodiments 119 to 131, wherein the one or more processors further execute the instructions to receive, from at least one other TRP of the cooperating set, the other TRP's scheduling decision for transmission of a PDSCH message to the UE, wherein transmitting, to the UE, at least one PDCCH message comprises transmitting a PDCCH message that includes DCI in respect of the PDSCH message the other TRP has scheduled for the UE.

Example Embodiment 133. The TRP of any one of Example Embodiments 119 to 131, wherein the one or more processors further execute the instructions to receive, from a central controller in the wireless network, a scheduling decision for transmission of a PDSCH message to the UE, wherein transmitting, to the UE, at least one PDCCH message comprises transmitting a PDCCH message that includes DCI in respect of the PDSCH message that has been scheduled by the central controller.

Example Embodiment 134. The TRP of any one of Example Embodiments 119 to 131, wherein the one or more processors further execute the instructions to:
  receive, from a central controller in the wireless network or another TRP in the cooperating set, a UE-specific aperiodic channel state information (CSI) request pattern; and
  transmit CSI requests aperiodically to the UE in accordance with the UE-specific aperiodic CSI request pattern.

Example Embodiment 135. The TRP of any one of Example Embodiments 119 to 131, wherein the one or more processors further execute the instructions to:
  receive, from a central controller in the wireless network or another TRP in the cooperating set, a UE-specific UL/DL TTI-based pattern; and
  communicate with the UE in accordance with the UE-specific UL/DL TTI-based pattern.

Example Embodiment 136. The TRP of any one of Example Embodiments 119 to 135, wherein the one or more processors further execute the instructions to co-ordinate with other cooperating TRPs to maintain non-overlapped search spaces for the UE.

Example Embodiment 137. The TRP of Example Embodiment 136, wherein the one or more processors further execute the instructions to perform downlink power control in search spaces used by other cooperating TRPs.

Example Embodiment 138. The TRP of any one of Example Embodiments 119 to 137, wherein the TRP shares a common frame structure with other TRPs in the cooperating set.

Example Embodiment 139. The TRP of any one of Example Embodiments 119 to 138, wherein the one or more processors further execute the instructions to transmit signaling to the UE, the signaling including information indicating at least one of the following:
  a control resource set;
  control search spaces;
  a relation of control resource sets and search spaces;
  a maximum number K of PDCCH messages that the UE can expect to receive;
  a UE-specific set of aggregation levels per PDCCH or each of multiple PDCCH messages.

Example Embodiment 140. The TRP of Example Embodiment 119, wherein K<=Pu, where Pu is the maximum number of PDCCH messages the UE is capable of receiving.

Example Embodiment 141. The TRP of Example Embodiment 119, wherein the one PDCCH message includes DCI in respect of a single PDSCH message from multiple TRPs in the cooperating set.

Example Embodiment 142. The TRP of Example Embodiment 141, wherein the single PDSCH message includes at least one codeword, each codeword including at least one data layer.

Example Embodiment 143. The TRP of any one of Example Embodiments 119 to 142, wherein the one or more processors further execute the instructions to transmit, to the UE, signaling to inform the UE of a configured set of PDCCH candidates for blind detection over at least one assigned search space, the configured set of PDCCH candidates including less than the total number of possible PDCCH candidates.

Example Embodiment 144. The TRP of Example Embodiment 143, wherein the configured set of PDCCH candidates is UE-specific.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in FIGS. 2 to 16 are also intended solely for illustrative purposes.

Other implementation details could also vary between different embodiments. For example, some of the examples above refer to LTE and NR terminology. However, the embodiments disclosed herein are not in any way limited to LTE/NR systems.

In addition, although described primarily in the context of methods and systems, other implementations are also contemplated, as instructions stored on a non-transitory processor-readable medium, for example. The instructions, when executed by one or more processors, cause the one or more processors to perform a method.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for a User Equipment (UE) in a wireless network, the method comprising:
   receiving, by the UE, a single physical downlink control channel (PDCCH) transmission carrying a single Downlink Control Information (DCI) message, the single DCI message includes a resource allocation field, the resource allocation field indicating time-frequency resources for receiving Physical Downlink Shared Channel (PDSCH) transmissions of one or more transport blocks from different transmit receive points (TRPs) allocated in a frequency division multiplexing (FDM) manner or in a time division multiplexing (TDM) manner, wherein different TRP transmissions are associated with a single serving cell in which the UE uses a single cell radio network temporary identifier (C-RNTI) across the different TRPs, wherein the time-frequency resources for the PDSCH transmissions are non-overlapping, and wherein the PDSCH transmissions include a first PDSCH transmission and a second PDSCH transmission; and receiving, by the UE, using the single C-RNTI, the one or more transport blocks in the PDSCH transmissions of the different TRPs based on the single DCI message, wherein the PDSCH transmissions carry a same transport block of the one or more transport blocks,
   wherein the time-frequency resources for the PDSCH transmissions are allocated in the FDM manner, the first PDSCH transmission from a first TRP of the different TRPs uses a first half of a bandwidth of the time-frequency resources, and the second PDSCH transmission from a second TRP of the different TRPs uses a second half of the bandwidth of the time-frequency resources, or
   wherein the time-frequency resources for the PDSCH transmissions are allocated in the TDM manner, the first PDSCH transmission from the first TRP uses the time-frequency resources at a first time for a time duration indicated by the resource allocation field, and the second PDSCH transmission from the second TRP uses the time-frequency resources at a second time for the time duration indicated by the resource allocation field.

2. A User Equipment (UE) comprising:
   at least one processor; and
   a non-transitory computer readable storage medium storing programming for execution by the at least one processor, the programming including instructions to cause the UE to:
   receive a single physical downlink control channel (PDCCH) transmission carrying a single Downlink Control Information (DCI) message, the single DCI includes a resource allocation field, the resource allocation field indicating time-frequency resources for receiving Physical Downlink Shared Channel (PDSCH) transmissions of one or more transport blocks from different transmit receive points (TRPs) allocated in a frequency division multiplexing (FDM) manner or in a time division multiplexing (TDM) manner, wherein different TRP transmissions are associated with a single serving cell in which the UE uses a single cell radio network temporary identifier (C-RNTI) across the different TRPs, wherein the time-frequency resources for the PDSCH transmissions are non-overlapping, and wherein the PDSCH transmissions include a first PDSCH transmission and a second PDSCH transmission; and
   receive, using the single C-RNTI, the one or more transport blocks in the PDSCH transmissions of the different TRPs based on the single DCI message, wherein the PDSCH transmissions carry a same transport block of the one or more transport blocks,
   wherein the time-frequency resources for the PDSCH transmissions are allocated in the FDM manner, the first PDSCH transmission from a first TRP of the different TRPs uses a first half of a bandwidth of the time-frequency resources, and the second PDSCH transmission from a second TRP of the different TRPs uses a second half of the bandwidth of the time-frequency resources, or
   wherein the time-frequency resources for the PDSCH transmissions are allocated in the TDM manner, the first PDSCH transmission from the first TRP uses the time-frequency resources at a first time for a time duration indicated by the resource allocation field, and the second PDSCH transmission from the second TRP uses the time-frequency resources at a second time for the time duration indicated by the resource allocation field.

3. A method for a transmit receive point (TRP) in a wireless network, the method comprising:
   transmitting, by the TRP to a User Equipment (UE), a single physical downlink control channel (PDCCH) transmission carrying a single Downlink Control Information (DCI) message, the single DCI message includes a resource allocation field, the resource allocation field indicating time-frequency resources for the UE to receive Physical Downlink Shared Channel (PDSCH) transmissions of one or more transport blocks from different TRPs including the TRP allocated in a frequency division multiplexing (FDM) manner or in a time division multiplexing (TDM) manner, wherein different TRP transmissions are associated with a single serving cell in which the UE uses a single cell radio network temporary identifier (C-RNTI) across the different TRPs, wherein the time-frequency resources for the PDSCH transmissions are non-overlapping, and wherein the PDSCH transmissions include a first PDSCH transmission and a second PDSCH transmission; and
   transmitting, by the TRP with rest of the different TRPs to the UE, using the single C-RNTI, the one or more transport blocks in the PDSCH transmissions of the different TRPs based on the single DCI message, wherein the PDSCH transmissions carry a same transport block of the one or more transport blocks,
   wherein the time-frequency resources for the PDSCH transmissions are allocated in the FDM manner, the first PDSCH transmission from a first TRP of the different TRPs uses a first half of a bandwidth of the time-frequency resources, and the second PDSCH transmission from a second TRP of the different TRPs uses a second half of the bandwidth of the time-frequency resources, or
   wherein the time-frequency resources for the PDSCH transmissions are allocated in the TDM manner, the first PDSCH transmission from the first TRP uses the time-frequency resources at a first time for a time duration indicated by the resource allocation field, and the second PDSCH transmission from the second TRP uses the time-frequency resources at a second time for the time duration indicated by the resource allocation field.

4. A transmit receive point (TRP) comprising:
   at least one processor; and
   a non-transitory computer readable storage medium storing programming for execution by the at least one processor, the programming including instructions to cause the TRP to:
   transmit, to a User Equipment (UE), a single physical downlink control channel (PDCCH) transmission carrying a single Downlink Control Information (DCI) message, the single DCI message includes a resource allocation field, the resource allocation field indicating time-frequency resources for the UE to receive Physical Downlink Shared Channel (PDSCH) transmissions of one or more transport blocks from different TRPs including the TRP allocated in a frequency division multiplexing (FDM) manner or in a time division multiplexing (TDM) manner, wherein different TRP transmissions are associated with a single serving cell in which the UE uses a single cell radio network temporary identifier (C-RNTI) across the different TRPs, wherein the time-frequency resources for the PDSCH transmissions are non-overlapping, and wherein the PDSCH transmissions include a first PDSCH transmission and a second PDSCH transmission; and
   transmit, with rest of the different TRPs to the UE, using the single C-RNTI, the one or more transport blocks in the PDSCH transmissions of the different TRPs based on the single DCI message, wherein the PDSCH transmissions carry a same transport block of the one or more transport blocks,
   wherein the time-frequency resources for the PDSCH transmissions are allocated in the FDM manner, the first PDSCH transmission from a first TRP of the different TRPs uses a first half of a bandwidth of the time-frequency resources, and the second PDSCH transmission from a second TRP of the different TRPs uses a second half of the bandwidth of the time-frequency resources, or
   wherein the time-frequency resources for the PDSCH transmissions are allocated in the TDM manner, the first PDSCH transmission from the first TRP uses the time-frequency resources at a first time for a time duration indicated by the resource allocation field, and the second PDSCH transmission from the second TRP uses the time-frequency resources at a second time for the time duration indicated by the resource allocation field.

\* \* \* \* \*